US012775772B2

(12) United States Patent
Thulasi et al.

(10) Patent No.: US 12,775,772 B2
(45) Date of Patent: Oct. 27, 2026

(54) VIA ADJUSTMENT IN INTEGRATED CIRCUITS BASED ON MACHINE LEARNING

(71) Applicant: Intel Corporation, Santa Clara, CA (US)

(72) Inventors: Sunita S. Thulasi, Portland, OR (US); Prashanth Kumar Siddhamshetty, Portland, OR (US); Minjung Kim, Portland, OR (US); Mark Horsch, Missouri City, TX (US); A S M Jonayat, North Plains, OR (US); Anish Shenoy, Mountain View, CA (US); Cheng-Tsung Lee, Beaverton, OR (US); Silvia Liong, Portland, OR (US); Dorian Alden, Portland, OR (US); Vipin Agrawal, Beaverton, OR (US); Anjan Raghunathan, Portland, OR (US); Rusty Wayne Conner, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 18/090,205

(22) Filed: Dec. 28, 2022

(65) Prior Publication Data

US 2024/0220702 A1 Jul. 4, 2024

(51) Int. Cl.
*G06F 30/398* (2020.01)
*H10W 70/63* (2026.01)
(Continued)

(52) U.S. Cl.
CPC ........ *G06F 30/398* (2020.01); *H10W 70/635* (2026.01); *H10W 70/65* (2026.01); *G06F 2113/18* (2020.01)

(58) Field of Classification Search
CPC .... G06F 30/392; G06F 30/394; G06F 30/398; G06F 2113/18; G06F 2119/18;
(Continued)

(56) References Cited

U.S. PATENT DOCUMENTS

| | | |
|---|---|---|
| 7,380,227 B1 | 5/2008 | Li |
| 2016/0162621 A1 | 6/2016 | Hamouda |

(Continued)

FOREIGN PATENT DOCUMENTS

WO 2019190566 A1 10/2019

OTHER PUBLICATIONS

Wikipedia, "Chemical-mechanical polishing," Wikipedia Foundation, Inc., Oct. 27, 2022, [https://en.wikipedia.org/w/index.php?title=Chemical-mechanical_polishing&oldid=1118572924] retrieved on Nov. 17, 2022, 4 pages.

(Continued)

*Primary Examiner* — Paul Dinh
(74) *Attorney, Agent, or Firm* — Hanley, Flight & Zimmerman, LLC

(57) ABSTRACT

Methods, apparatus, systems, and articles of manufacture are disclosed to adjust vias in integrated circuits (ICs) based on machine learning (ML). An example apparatus computes a dimension by which to extend a via based on at least one of a first metal wire in a first layer of the IC above the via, a via-to-via patterning constraint, or a via-to-metal shorting constraint for a second layer of the IC below the via. The example apparatus also computes a shifted position of the via based on at least one of (a) the dimension or (b) a width and a position of a second metal wire below the via, the width and the position predicted by an ML model. Additionally, the example apparatus adjusts a configuration file corresponding to the IC based on at least one of the dimension or the shifted position of the via.

14 Claims, 17 Drawing Sheets

(51) Int. Cl.
*H10W 70/65* (2026.01)
*G06F 113/18* (2020.01)

(58) Field of Classification Search
CPC .. G06F 2119/22; G06F 30/27; G06F 30/3953; H10W 70/635; H10W 70/65; G03F 1/36
USPC .......................................................... 716/126
See application file for complete search history.

(56) References Cited

U.S. PATENT DOCUMENTS

| | | | | |
|---|---|---|---|---|
| 2018/0322234 | A1 | 11/2018 | Cao et al. | |
| 2022/0028779 | A1 | 1/2022 | Morrow et al. | |
| 2023/0351088 | A1 * | 11/2023 | Oriordan | G06F 30/3953 |

OTHER PUBLICATIONS

Wikipedia, "Copper interconnects," Wikipedia Foundation, Inc., Sep. 24, 2022, [https://en.wikipedia.org/w/index.php?title=Copper_interconnects&oldid=1112086897] retrieved on Nov. 17, 2022, 3 pages.

Wikipedia, "Decision tree learning," Wikipedia Foundation, Inc., Oct. 19, 2022, [https://en.wikipedia.org/w/index.php?title=Decision_tree_learning&oldid=1116935696] retrieved on Nov. 3, 2022, 17 pages.

Wikipedia, "Electronic design automation," Wikipedia Foundation, Inc., Oct. 5, 2022, [https://en.wikipedia.org/w/index.php?title=Electronic_design_automation&oldid=1114320115] retrieved on Nov. 17, 2022, 7 pages.

Wikipedia, "Etching (microfabrication)," Wikipedia Foundation, Inc., Nov. 2, 2022, [https://en.wikipedia.org/w/index.php?title=Etching_(microfabrication)&oldid=1119669965] retrieved on Nov. 17, 2022, 9 pages.

Wikipedia, "Gradient boosting," Wikipedia Foundation, Inc., Oct. 21, 2022, [https://en.wikipedia.org/w/index.php?title=Gradient_boosting&oldid=1117338984] retrieved on Nov. 3, 2022, 12 pages.

Wikipedia, "Interposer," Wikipedia Foundation, Inc., Aug. 28, 2022, [https://en.wikipedia.org/w/index.php?title=Interposer&oldid=1107207143] retrieved on Nov. 17, 2022, 3 pages.

Wikipedia, "Open Artwork System Interchange Standard," Wikipedia Foundation, Inc., Sep. 21, 2022, [https://en.wikipedia.org/w/index.php?title=Open_Artwork_System_Interchange_Standard&oldid=1111558483] retrieved on Nov. 17, 2022, 5 pages.

Wikipedia, "Optical proximity correction," Wikipedia Foundation, Inc., Oct. 5, 2022, [https://en.wikipedia.org/w/index.php?title=Optical_proximity_correction&oldid=1114314701] retrieved on Nov. 17, 2022, 6 pages.

Semiconductor Engineering, "Optical Proximity Correction (OPC)," SMG, [https://semiengineering.com/knowledge_centers/manufacturing/lithography/photomask/optical-proximity-correction-opc/] retrieved on Nov. 17, 2022, 6 pages.

Wikipedia, "Photolithography," Wikipedia Foundation, Inc., Nov. 13, 2022, [https://en.wikipedia.org/w/index.php?title=Photolithography&oldid=1121704065] retrieved on Nov. 17, 2022, 16 pages.

Wikipedia, "Planar process," Wikipedia Foundation, Inc., Nov. 10, 2022, [https://en.wikipedia.org/w/index.php?title=Planar_process&oldid=1121032517] retrieved on Nov. 17, 2022, 4 pages.

Wikipedia, "Semiconductor device fabrication," Wikipedia Foundation, Inc., Nov. 2, 2022, [https://en.wikipedia.org/w/index.php?title=Semiconductor_device_fabrication&oldid=1119636115] retrieved on Nov. 17, 2022, 17 pages.

Apogeeweb, "Semiconductor Manufacturing Steps with Flow Charts," Apogeeweb, Aug. 18, 2021, [https://www.apogeeweb.net/electron/semiconductor-manufacturing-steps-with-flow-charts.html] retrieved on Nov. 17, 2022, 22 pages.

Wikipedia, "Technology CAD," Wikipedia Foundation, Inc., Aug. 29, 2022, [https://en.wikipedia.org/w/index.php?title=Technology_CAD&oldid=1107303853] retrieved on Nov. 17, 2022, 5 pages.

Wikipedia, "Thin film," Wikipedia Foundation, Inc., Nov. 16, 2022, [https://en.wikipedia.org/w/index.php?title=Thin_film&oldid=1122149998] retrieved on Nov. 17, 2022, 15 pages.

Wikipedia, "Three-dimensional integrated circuit," Wikipedia Foundation, Inc., Oct. 21, 2022, [https://en.wikipedia.org/w/index.php?title=Three-dimensional_integrated_circuit&oldid=1117408018] retrieved on Nov. 17, 2022, 21 pages.

Wikipedia, "Through-silicon via," Wikipedia Foundation, Inc., Aug. 3, 2022, [https://en.wikipedia.org/w/index.php?title=Through-silicon_via&oldid=1102059576] retrieved on Nov. 17, 2022, 6 pages.

Wikipedia, "XGBoost," Wikipedia Foundation, Inc., Sep. 24, 2022, [https://en.wikipedia.org/w/index.php?title=XGBoost&oldid=1112145594] retrieved on Nov. 3, 2022, 5 pages.

Morde, "XGBoost Algorithm: Long May She Reign!," Towards Data Science, Apr. 7, 2019, [https://towardsdatascience.com/https-medium-com-vishalmorde-xgboost-algorithm-long-she-may-rein-edd9f99be63d] retrieved on Nov. 3, 2022, 14 pages.

DMLC XGBoost, "XGBoost Documentation," xgboost developers, [https://xgboost.readthedocs.io/en/stable/] retrieved on Jul. 27, 2023, 3 pages.

European Patent Office, "Extended European Search Report," issued in connection with European Patent Application No. 23200721.1-1224, dated Mar. 11, 2024, 14 pages.

* cited by examiner

VIA ADJUSTMENT IN INTEGRATED CIRCUITS BASED ON MACHINE LEARNING

FIELD OF THE DISCLOSURE

This disclosure relates generally to semiconductors and, more particularly, to via adjustment in integrated circuits based on machine learning.

BACKGROUND

The demand to manufacture integrated circuit (IC) packages with smaller form factors, better performance, lower power consumption, and/or higher density integrity has driven efforts to incorporate multiple semiconductor (e.g., Silicon (Si), Gallium Arsenide (GaAs), etc.) dies into a single package. One technique to incorporate multiple dies into a single package is to exploit the Z-dimension with respect to a bulk region of a base semiconductor substrate (e.g., a semiconductor wafer) on which components of an IC are formed. In some such three-dimensional (3D) ICs, separate dies are stacked and interconnected through metal wiring, vias, and/or other electrical interconnects within a substrate to which the separate dies are attached. Vias may be implemented by a hole in a dielectric fill of an IC that allows for a metal wire above the via to connect to a metal wire below the via. Vias that are disposed vertically with respect to a bulk region of a base semiconductor substrate on which components of an IC are formed are referred to herein as through-semiconductor vias (TSVs).

Figure 1A:
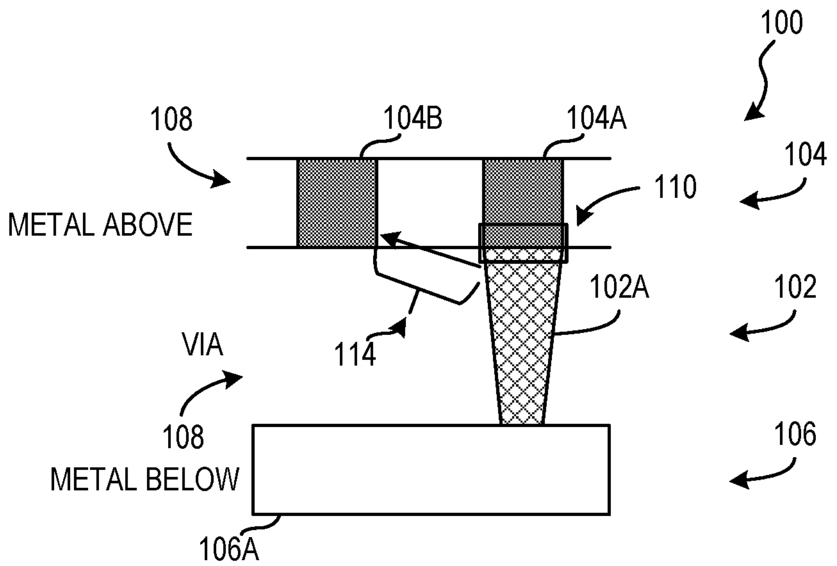
FIGS. 1A and 1B illustrate a cross-sectional side view of an example IC depicting an example via layer in relation to surrounding features of the IC.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

In the case of a semiconductor device, "above" describes the relationship of two parts relative to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate than the second component.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s). In some examples, ASICs are referred to as application specific integrated circuitry.

DETAILED DESCRIPTION

Semiconductor devices, including 3D ICs, are complex devices. For example, fabrication of a semiconductor device includes many processes such as semiconductor wafer processing, wafer oxidation, photolithography (e.g., application of one or more photomasks to a wafer, light irradiation, and development), etching, thin film deposition, doping, and interconnection of one or more circuits of the semiconductor device. These fabrication processes result in one or more semiconductor dies including multiple transistors. Each transistor includes multiple layers. As such, an individual semiconductor die includes multiple layers. Additionally, separate dies may be stacked and interconnected through wiring and/or TSVs within a substrate to which the separate dies are attached.

For example, a 3D IC includes one or more metal layers and one or more via layers. In examples disclosed herein, a metal layer refers to a layer of an IC including one or more metal wires that couple one or more semiconductor regions of the IC and/or one or more vias (e.g., TSVs). Additionally, in examples disclosed herein, a via layer refers to a layer of an IC including one or more vias (e.g., TSVs) coupling one or more semiconductor regions of the IC and/or one or more metal wires. Generally, a via layer is disposed between a first metal layer above the via layer and a second metal layer below the via layer.

To aid in the design of semiconductor devices, semiconductor design and manufacturing entities have developed electronic design automation (EDA) tools. Such EDA tools output configuration files for manufacturing equipment at semiconductor fabrication plants. For example, a configuration file may be represented in the Open Artwork System Interchange Standard (OASIS) developed by Semiconductor Equipment and Materials International (SEMI®). OASIS files are binary files that represent the electronic layout of an IC during the design and manufacture of the IC. OASIS files define not only the semiconductor components of an IC, but also, the metal layers within and via layers between semiconductor substrates.

Generally, OASIS files specify geometric shapes (e.g., rectangles, trapezoids, polygons, etc.) that represent components to be fabricated on a die, properties of the geometric shapes, how the geometric shapes are organized into cells containing patterns, and how each pattern can be placed relative to other patterns. For example, for a geometric shape that is to be fabricated on a die of a semiconductor device, an OASIS file defines the layer of the semiconductor device in which the geometric shape is to be fabricated, a datatype of the geometric shape, a width of the geometric shape, a height of the geometric shape, a lower-left X-coordinate of the geometric shape, and a lower-left Y-coordinate of the geometric shape. In such OASIS files, the metal layout (e.g., the one or more metal layers and/or one or more via layers of the IC) is specified using rectilinear coordinates. As such, the metal layout is limited to metal layers including straight metal wires and/or 90-degree turns in the metal wires.

Due to the complexity of modern ICs, modern configuration files can include billions of geometric shapes, properties, and placements. As such, modern EDA tools have been developed to improve ease-of-use. For example, modern EDA tools include less restrictive design rules for metal layers as compared to other layers of an IC. For example, the less restrictive design rules allow IC designers to more easily implement a set of layout rules for the metal layout of an IC. As described above, the metal layout of an IC includes a layout of metal layers within and via layers between semiconductor substrates (e.g., dies) of the IC.

While the less restrictive rules of modern EDA tools improve the ease-of-use of such tools, the less restrictive rules result in metal layouts that have a very large (e.g., on the order of thousands) combination of metal wire widths and pitches. As used herein, the term "pitch" describes the distance between two metal wires. For example, pitch may be measured as the distance from the center of a first metal wire to the center of a second metal wire. The large combination of metal wire widths and pitches as well as the many parameters involved in semiconductor device fabrication result in a multi-dimensional space of possible combinations of input parameters to the semiconductor fabrication process. To ensure a process window that yields a large percentage (e.g., greater than or equal to 95%) of operable ICs per fabrication, process window optimization techniques (e.g., optical proximity correction (OPC) techniques) are applied to the metal layout of an IC that is included in a configuration file. For example, OPC techniques are applied to both the metal layers and via layers on an IC. As used herein, the term "process window" describes a sub-space within a multi-dimensional space of possible combinations of input parameters to a semiconductor fabrication process that corresponds to device specifications of ICs manufactured on a wafer according to the semiconductor fabrication process.

As described above, process window optimization techniques such as OPC techniques are applied to the metal layout of an IC. For example, when applied to a metal layer, OPC techniques shift the metal wires of the metal layer and increase the permissible variation in input parameters to the fabrication process while still generating a high yield of ICs. While OPC techniques improve the process window for a given IC, OPC techniques also result in large movement and sizing changes of the metal wires from the positions and sizes specified in the configuration file. Such shifting and sizing changes to the metal wires will result in many metal wires where the actual on-wafer-pattern is significantly curved or widened from the specification of the metal wires in the configuration file. These shifts in position and sizing changes can result in reduced overlap between the metal wires and TSVs. Additionally, the shifts in position and sizing changes can reduce the permissible variation in input parameters which reduces the overall integrated margin for the metal wires.

Figure 1B:
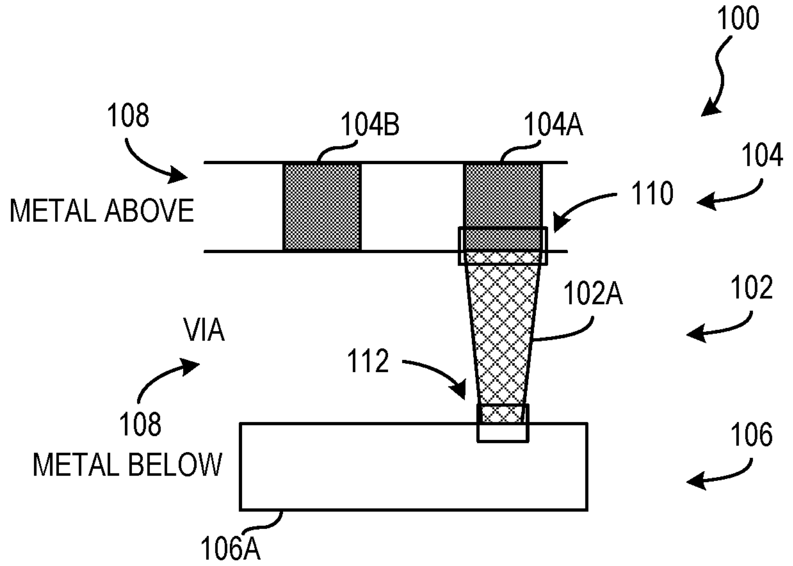

For example, FIGS. 1A and 1B (collectively FIG. 1) illustrate a cross-sectional side view of an example IC 100 depicting an example via layer 102 in relation to surrounding features of the IC 100. The IC 100 includes the example via layer 102, an example first metal layer 104, and an example second metal layer 106. In the example of FIG. 1, the via layer 102 includes an example first via 102A. The example first metal layer 104 includes an example first metal wire 104A and an example second metal wire 104B. In the example of FIG. 1, the example second metal layer 106 includes an example third metal wire 106A.

In the illustrated example of FIG. 1, the first via 102A, the first metal wire 104A, the second metal wire 104B, and the third metal wire 106A are embedded in example dielectric 108. The example first metal layer 104 of the IC 100 is above the example via layer 102. Additionally, in the example of FIG. 1, the second metal layer 106 of the IC 100 is below the via layer 102. As such, in the example of FIG. 1, the first via 102A is a TSV. The functional purpose of the first via 102A in the IC 100 is to connect the first metal wire 104A and the third metal wire 106A.

In example semiconductor device fabrication, the degree of overlap between a via and the metal wires connected by the via is a key metric that is directly tied to both yield and performance of the resulting IC. For example, in FIG. 1, an example first region 110 represents the amount of the first via 102A that is covered by the first metal wire 104A, which is in the first metal layer 104 of the IC 100 that is above the via layer 102. Additionally, in the example FIG. 1, an example second region 112 represents the amount of the third metal wire 106A that is covered by the first via 102A where the third metal wire 106A is in the second metal layer 106 of the IC 100 that is below the via layer 102. Examples disclosed herein utilize a combined via coverage metric as a proxy for yield and performance of an IC. Disclosed combined via coverage metrics combine the area of overlap between a via and the metal wires above and below the via. For example, a combined via coverage metric may be computed as the intersection of the area of the first via 102A covered by the first metal wire 104A (e.g., the first region 110) and the area of the third metal wire 106A covered by the first via 102A (e.g., the second region 112) (e.g., $M_{Combined\_Via\_Coverage} = A_{Coverage\_Metal\_\_Above} \cap A_{Coverage\_Metal\_Below}$).

Examples disclosed herein also include via-to-metal shorting metric which represents the risk of a via creating an unintended connection with a metal wire. For example, FIG. 1 illustrates an example unintended connection 114 between the first via 102A and the second metal wire 104B. The risk of a via creating an unintended connection with a metal wire directly impacts yield and performance of the resulting IC. Example via-to-metal shorting metrics are relevant to both the metal wires in a layer above a via and the metal wires in a layer below a via.

As described above, modern EDA tools include flexible pitch design rules for metal layers. These flexible pitch design rules remove the necessity of having fully populated metal wires in a configuration file and help reduce undesirable increases in capacitance between the layers of an IC while making routing easier for industry standard tools. For example, layers designed with flexible pitch design rules allow for large variations in the space between metal wires (e.g., the space can be anything larger than a defined minimum value) and can result in large, abrupt pitch transitions. Using photolithography to pattern the variations in pitches can reduce the size of the process window for metal layers. As described above, process window optimization techniques (e.g., OPC techniques) provide a process window that yields a large percentage of operable ICs per fabrication, but also result in sizing and shifting of the metal wires which can cause reduced via coverage and increase the risk of via-to-metal shorting thereby reducing the size of the process window.

Figure 2A:
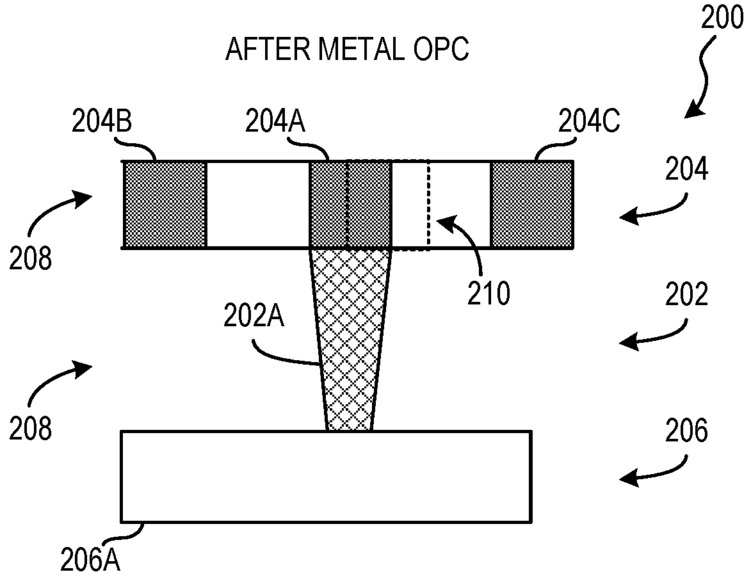
FIGS. 2A and 2B illustrate cross-sectional side views of an example IC depicting an example via layer in relation to surrounding features of the IC after optical proximity correction techniques have been applied to an electronic layout of the IC.
Figure 2B:
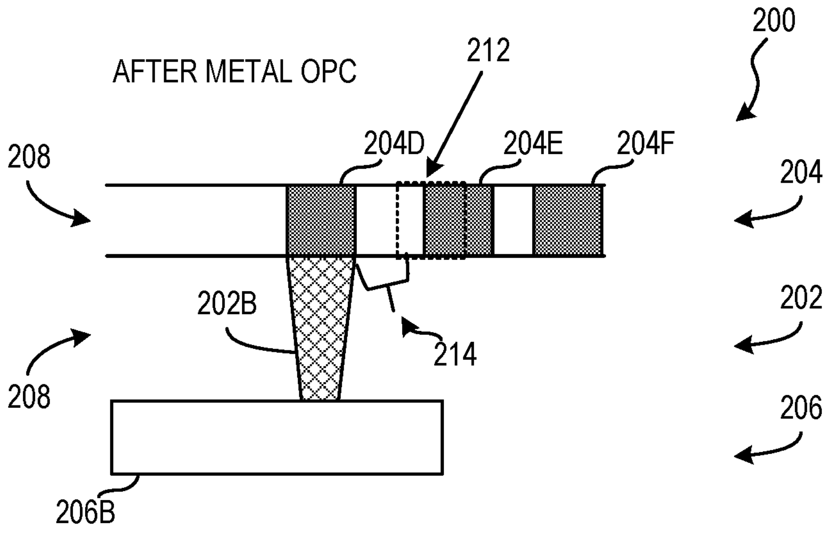

For example, FIGS. 2A and 2B illustrate cross-sectional side views of an example IC 200 depicting an example via layer 202 in relation to surrounding features of the IC 200 after optical proximity correction techniques have been applied to an electronic layout of the IC 200. For example, in FIG. 2A, the IC 200 includes the example via layer 202, an example first metal layer 204, and an example third metal layer 206. In the example of FIG. 2A, the via layer 202 includes an example first via 202A. The example first metal layer 204 includes an example first metal wire 204A, an example second metal wire 204B, an example third metal wire 204C. In the example of FIG. 2A, the second metal layer 206 includes an example fourth metal wire 206A.

In the illustrated example of FIG. 2A, the first via 202A, the first metal wire 204A, the second metal wire 204B, the third metal wire 204C, and the fourth metal wire 206A are embedded in example dielectric 208. The example first metal layer 204 of the IC 200 is above the example via layer 202. Additionally, in the example of FIG. 2A, the second metal layer 206 of the IC 200 is below the via layer 202. As such, in the example of FIG. 2A, the first via 202A is a TSV.

The functional purpose of the first via 202A in the IC 200 is to connect the first metal wire 204A and the fourth metal wire 206A.

In the illustrated example of FIG. 2B, the via layer 202 includes an example second via 202B. The example first metal layer 204 includes an example fifth metal wire 204D, an example sixth metal wire 204E, and an example seventh metal wire 204F. In the example of FIG. 2B, the second metal layer 206 includes an example eighth metal wire 206B. In the example of FIG. 2B, the second via 202B, the fifth metal wire 204D, the sixth metal wire 204E, the seventh metal wire 204F, and the eighth metal wire 206B are embedded in the example dielectric 208. As described above, the example first metal layer 204 of the IC 200 is above the via layer 202 and the second metal layer 206 of the IC 200 is below the via layer 202. As such, in the example of FIG. 2B, the second via 202B is a TSV. The functional purpose of the second via 202B in the IC 200 is to connect the fifth metal wire 204D and the eighth metal wire 206B.

In the illustrated examples of FIGS. 2A and 2B, solid lines illustrate positions of components in the IC 200 before OPC techniques have been applied to metal layers and dashed lines illustrate positions of metal wires in the IC 200 that have been shifted, if any, after application of OPC techniques. For example, in FIG. 2A, an example first box 210 illustrates a shifted position of the first metal wire 204A after application of OPC techniques to the first metal layer 204. In the example of FIG. 2A, the shifted position of the first metal wire 204A (e.g., represented by the first box 210) results in reduced via coverage with respect to the first via 202A. Additionally, for example, in FIG. 2B, an example second box 212 illustrates a shifted position of the sixth metal wire 204E after application of OPC techniques. In the example of FIG. 2B, the shifted position of the sixth metal wire 204E (e.g., represented by the second box 212) results in an increased risk of an example unintended connection 214 between the second via 202B and the sixth metal wire 204E because the shifted position of the sixth metal wire 204E (e.g., represented by the second box 212) is closer to the second via 202B than before the shift.

Figure 3:
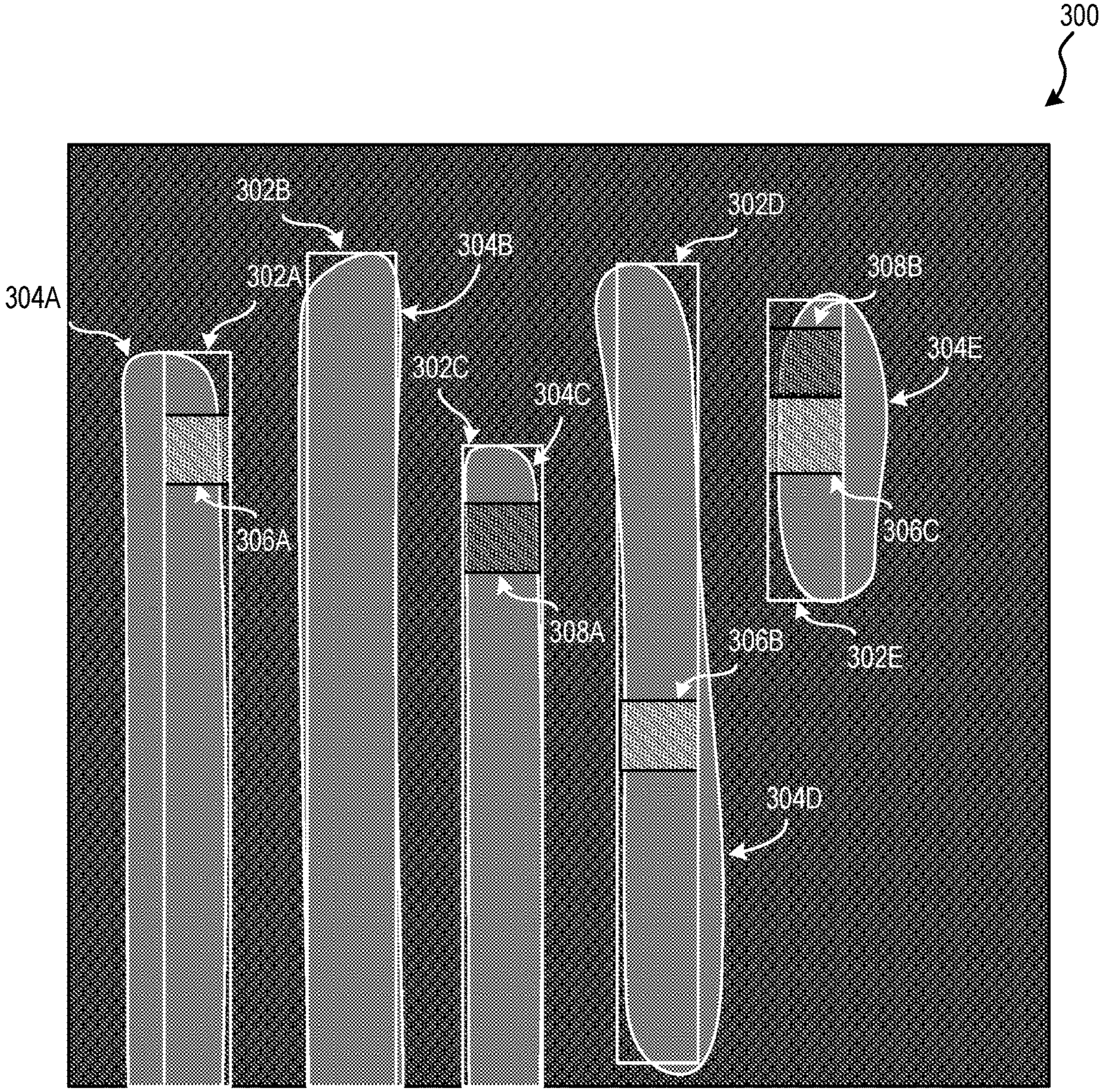
FIG. 3 is a scanning electron microscope (SEM) image illustrating example shifts in the positions and widths of metal wires after application of optical proximity correction techniques.

As described above, process window optimization techniques, such as OPC techniques, have supplemental effects on the metal wires in an IC. For example, FIG. 3 is an SEM image 300 illustrating example shifts in the positions and widths of metal wires of a metal layer after application of OPC techniques. The SEM image 300 illustrates example first positions 302A-E of metal wires to be embedded in a metal layer of a semiconductor as defined in a configuration file, example second positions 304A-E of the metal wires as embedded in the metal layer of the semiconductor after application of OPC techniques, example third positions 306A-C of vias in a via layer below the metal layer as defined in the configuration file, and example fourth positions 308A-B of vias in a via layer above the metal layer as defined in the configuration file. As demonstrated in FIG. 3, a large shift from the first positions 302A-E of the metal wires to the second positions 304A-E of the metal wires reduces via coverage. For example, a second position 304A of a first metal wire in the metal layer after application of OPC techniques causes the first metal wire to have reduced overlap with a first via (e.g., at a third position 306A defined in the configuration file) in the via layer below the metal layer as compared to the overlap of the first metal wire at a first position 302A as defined in the configuration file. Furthermore, FIG. 3 demonstrates that the amount a metal wire is shifted is a function of the neighboring metal wires in the metal layer.

To improve via coverage and reduce via-to-metal shorting risks, some techniques implement rules to compensate for movement of metal wires during application of OPC techniques to metal layers. For example, a first technique limits the amount a metal wire can be shifted when the metal wire is within the presence of a via. However, according to the first technique, metal wires cannot be shifted as far as desired to provide the largest possible process window for a given application. Furthermore, under the first technique, via coverage is highly sensitive to misregistration between different layers of an IC while the IC is being fabricated at a semiconductor fabrication plant. Additionally, under the first technique, the critical dimensions (CDs) of metal wires varies depending on whether a via is present (e.g., a metal wire with a 40 nanometer (nm) CD that intersects a via may not be shifted or resized as much as a metal wire with a 40 nm CD that does not intersect a via).

A second example technique to improve via coverage and reduce via-to-metal shorting risks utilizes a rule-based algorithm to predict the movement of the metal wires based on a space imbalance to the left and right of a given metal wire. According to the second technique, the positions of vias are shifted based on the predicted movement of the metal wires but shifts are restricted to only 50% of the predicted movement of the metal wires. However, because the second technique relies on a rule-based algorithm, the number of rules that can be implemented is significantly limited (e.g., to around 20-25 rules before the rule-based algorithm becomes unmanageable), and adjustments to the positions of vias for some geometries are restricted.

Furthermore, under the second technique, the shifted positions of vias are not based on the final positions (e.g., predicted final positions) of metal wires. For example, the rule-based algorithm of the second technique predicts movement of metal wires that will result from the application of OPC techniques, but, according to the second technique, a subsequent algorithm further adjusts the position of the metal wires. As such, under the second technique, vias are only shifted partially (e.g., 50%) in the direction of the predicted position of metal wires to ensure that there are not overcorrections that would result in less via-to-metal overlap (e.g., a smaller via coverage metric). Additionally, the further adjustments to the position of the metal wires by the subsequent algorithm of the second technique may undo the benefits achieved by the shifts to vias based on the initial predicted movement of the metal wires.

To improve via coverage and reduce via-to-metal shorting risks (e.g., to offset via-to-metal overlap marginality) induced by the application of OPC techniques, examples disclosed herein adjust at least one of the position or shape of a via based adjusted positions of metal wires above and below the via. For example, disclosed methods, apparatus, and articles of manufacture include a machine learning (ML) based algorithm that identifies how the position and/or shape of a via should be adjusted (e.g., shifted and/or increased, respectively) to improve via-to-metal overlap (e.g., to increase a via coverage metric) without reducing shorting margin (e.g., increasing a via-to-metal shorting metric).

Figure 4:
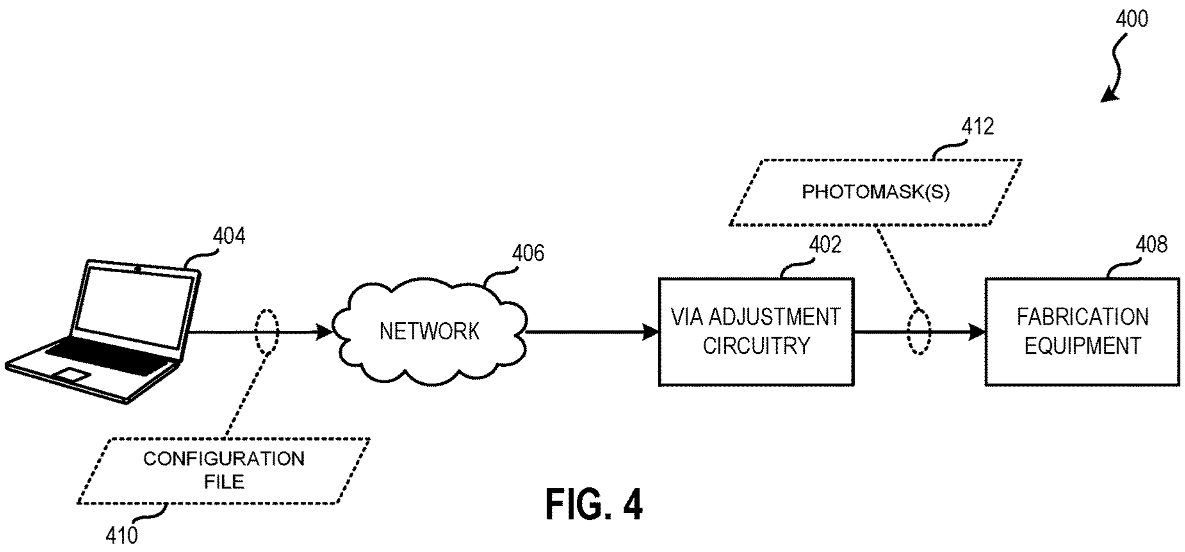
FIG. 4 is a block diagram of an example environment including example via adjustment circuitry and an example endpoint device.

FIG. 4 is a block diagram of an example environment 400 including example via adjustment circuitry 402, an example endpoint device 404, an example network 406, and an example fabrication equipment 408. In the example of FIG. 4, the example via adjustment circuitry 402, the example endpoint device 404, and/or one or more additional devices are communicatively coupled via the example network 406.

Additionally, the example via adjustment circuitry 402 is communicatively coupled to the example fabrication equipment 408.

In the illustrated example of FIG. 4, the via adjustment circuitry 402 is implemented by one or more servers executing machine readable instructions. In additional or alternative examples, the via adjustment circuitry 402 is implemented by processor circuitry, analog circuit(s), digital circuit(s), logic circuit(s), programmable processor(s), programmable microcontroller(s), graphics processor unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). In the example of FIG. 4, the via adjustment circuitry 402 adjusts the positions and/or dimensions of vias defined in an example configuration file 410.

For example, the via adjustment circuitry 402 implements an ML model to predict positions and widths (e.g., final positions and widths) of metal wires in metal layers below vias. Predictions made by the via adjustment circuitry 402 predict positions and widths of metal wires in metal layers below vias that will result from application of OPC techniques as well as any subsequent algorithms that will further adjusts the position and/or widths of the metal wires. The via adjustment circuitry 402 shifts positions of vias of the IC based on the predicted positions and widths of metal wires in metal layers below vias. Additionally or alternatively, in some examples, the ML model implemented by the via adjustment circuitry 402 predicts positions and widths of metal wires in metal layers above vias and the via adjustment circuitry 402 adjusts at least one of the position or size of vias based on the predicted positions and widths.

Additionally, in the example of FIG. 4, the via adjustment circuitry 402 adjusts the dimensions of vias by adding one or more wings to vias to compensate for movement and changes in width of metal wires in metal layers above vias. To implement example via wings, the via adjustment circuitry 402 adjusts the configuration file 410 to define one or more sloped cavities along one or more edges of a via. The one or more sloped cavities are regions of an IC substrate that are to be removed from the IC during fabrication and filled with metal. In this manner, example via wings extend the footprint of a via and improve coupling between the metal wires in metal layers above and below a via. Example via wings are discussed further below. Additionally or alternatively, in some examples, the via adjustment circuitry 402 adjusts the dimensions of vias by adding one or more wings to vias to compensate for movement and changes in width of metal wires in metal layers below vias.

In the illustrated example of FIG. 4, the endpoint device 404 is implemented by a laptop computer. In additional or alternative examples, the endpoint device 404 is implemented by a mobile phone, a tablet computer, a desktop computer, a server, among others, including processor circuitry, analog circuit(s), digital circuit(s), logic circuit(s), programmable processor(s), programmable microcontroller(s), GPU(s), DSP(s), ASIC(s), PLD(s), and/or FPLD(s) such as FPGAs. Although the endpoint device 404 is illustrated as a single device in the example of FIG. 4, in additional or alternative examples, the endpoint device 404 is implemented by multiple devices. In the example of FIG. 4, an EDA tool (e.g., EDA software) is installed on the endpoint device 404. The example endpoint device 404 executes the EDA tool to generate the configuration file 410.

In the illustrated example of FIG. 4, the network 406 is implemented by the Internet. However, the example network 406 may be implemented using any suitable wired and/or wireless network(s) including, for example, one or more data buses, one or more Local Area Networks (LANs), one or more wireless LANs, one or more cellular networks, one or more private networks, one or more public networks, etc. In additional or alternative examples, the network 406 is an enterprise network (e.g., within businesses, corporations, etc.), a home network, among others. The example network 406 enables the endpoint device 404 to communicate with the via adjustment circuitry 402.

In the illustrated example of FIG. 4, the fabrication equipment 408 is implemented by one or more dicing machines, one or more oxidation systems, ion implantation equipment, one or more physical vapor deposition systems, one or more chemical vapor deposition system, photolithography equipment, etching equipment, one or more chemical-mechanical planarization (CMP) machines, and/or one or more probing machines. In some examples, the fabrication equipment 408 includes additional or alternative equipment. In the example of FIG. 4, the fabrication equipment 408 is housed in a semiconductor fabrication plant owned, rented, and/or operated by one or more semiconductor design and/or manufacturing entities.

In the illustrated example of FIG. 4, the via adjustment circuitry 402 is associated with the semiconductor fabrication plant housing the fabrication equipment 408. For example, the via adjustment circuitry 402 may be implemented within the semiconductor fabrication plant. Additionally or alternatively, the via adjustment circuitry 402 may be implemented by a cloud computing platform communicatively coupled to the semiconductor fabrication plant. The example cloud computing platform may be implemented by at least one of an on-premises cloud computing platform or a remote cloud computing platform (e.g., offered by Amazon Web Services®, Microsoft Azure®, Google Cloud® Platform, Alibaba Cloud®, Oracle Cloud®, etc.).

In the illustrated example of FIG. 4, when the endpoint device 404 sends the configuration file 410 for fabrication, a chip designer of the corresponding IC may not be aware that the via adjustment circuitry 402 will adjust the positions and/or dimensions of vias defined in the configuration file 410 prior to fabrication of the IC. In the example of FIG. 4, the via adjustment circuitry 402 preprocesses configuration files (e.g., the configuration file 410) corresponding to ICs to adjust the positions and/or shapes of vias defined in the configuration files. Additionally, the via adjustment circuitry 402 generates one or more example photomasks 412 based on the adjusted positions and/or shapes of the vias. The via adjustment circuitry 402 provides the one or more photomasks 412 to the fabrication equipment 408 which fabricates one or more ICs based on the one or more photomasks 412.

In the illustrated example of FIG. 4, to provide the configuration file 410 to the via adjustment circuitry 402, the endpoint device 404 accesses a service and/or product offered by a semiconductor design and/or manufacturing entity that owns, rents, and/or operates a semiconductor fabrication plant including the fabrication equipment 408. For example, a chip designer accesses the service and/or product to upload the configuration file 410. In example of FIG. 4, the endpoint device 404 accesses the service and/or product via a web-interface. In some examples, an EDA tool installed on the endpoint device 404 includes a plugin integrated with a fabrication process including the via adjustment circuitry 402 and the fabrication equipment 408. For example, a chip designer defines the configuration file 410 in the EDA tool, selects an icon corresponding to the plugin, and the plugin formats the configuration file 410 for the fabrication process and causes transmission of the configuration file 410 to the network 406. The example adjustment circuitry 402 then preprocesses the configuration file 410 as described herein.

As described above, in the example of FIG. 4, the via adjustment circuitry 402 implements an ML model to predict positions and widths (e.g., final positions and widths) of metal wires in metal layers below vias. Artificial intelligence (AI), including ML, deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of ML models and/or ML architectures exist. In examples disclosed herein, an XGBoost model is used. Using an XGBoost model enables improved processing of structured and/or tabular data such as that included in configuration files. In general, ML models/architectures that are suitable to use in the example approaches disclosed herein will be those that utilize gradient boosting. However, other types of ML models could additionally or alternatively be used such as decision tree models, among others.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the ML model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using a gradient boosting training algorithm. However, any other training algorithm may additionally or alternatively be used. In examples disclosed herein, training is performed until the error between predicted positions and widths of metal wires and the position and width of metal wires as fabricated on an IC satisfies a threshold error (e.g., a minimum error). In examples disclosed herein, training is performed remotely at a central facility of an entity offering services of the via adjustment circuitry 402 (e.g., a semiconductor design and/or manufacturing entity that owns, rents, and/or operates a semiconductor fabrication plant including the fabrication equipment 408). For example, the ML model implemented by the via adjustment circuitry 402 utilizes many computational resources (e.g., on the order of 800 CPU cores) during training.

As described above, training is performed using hyperparameters that control how the learning is performed (e.g., a learning rate, a number of layers to be used in the ML model, etc.). In examples disclosed herein, hyperparameters that control the number of trees in the XGBoost model, a depth of each tree, etc. are utilized. Such hyperparameters are selected by, for example, an engineer designing the ML model. In some examples, retraining may be performed. For example, during development of the ML model, the ML model may be retrained in response to new training data becoming available. Additionally, training is performed using training data. In examples disclosed herein, the training data originates from a locally generated dataset generated by the entity developing the ML model (e.g., a semiconductor design and/or manufacturing entity that owns, rents, and/or operates a semiconductor fabrication plant including the fabrication equipment 408). For example, the locally generated dataset includes both synthetic (e.g., artificially generated) data and actual data indicative of positions and widths of metal wires after process window optimization techniques (e.g., OPC techniques) have been applied to a configuration file.

In examples disclosed herein, because supervised training is used, the training data is labeled. For example, training data is separated into labeled groups based on geometric context of metal wires, positions of metal wires relative to other metal wires, and widths and lengths of metal wires. An example group may be labelled based on geometric context of metal wires, positions of metal wires relative to other metal wires, and a lower-left Y-coordinate of metal wires. A mean value is also computed for each labeled group. Labeling is applied to the training data by a human, such as an engineer developing the ML model. In some examples, the training data is sub-divided into a training set and a validation set. Once training is complete, the model is deployed for use as an executable construct that processes an input and provides an output based on the network of nodes and connections defined in the model.

For example, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes preprocessing before being used as an input to the machine learning model. Moreover, in some examples, the output data may undergo postprocessing after it is generated by the AI model to transform the output into a useful result (e.g., a display of data, an instruction to be executed by a machine, etc.). In some examples, the output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In the example of FIG. 4, deployed models are stored at a facility owned, rented, and/or operated by an entity that developed the ML model (e.g., a semiconductor design and/or manufacturing entity that owns, rents, and/or operates a semiconductor fabrication plant including the fabrication equipment 408). In some examples, a deployed model may be licensed to other entities in the same field as the entity that developed the ML model (e.g., other semiconductor design and/or manufacturing entities). A deployed model may be executed by the one or more servers. For example, an individual inference performed by the ML model may not be a computationally intensive task. However, performing inferences with the ML model at scale may require the utilization of elastic computational resources due to the volume of inferences performed by the ML model. As such, a deployed model may be implemented by a cloud computing platform (e.g., on-premises and/or remote).

Figure 5:
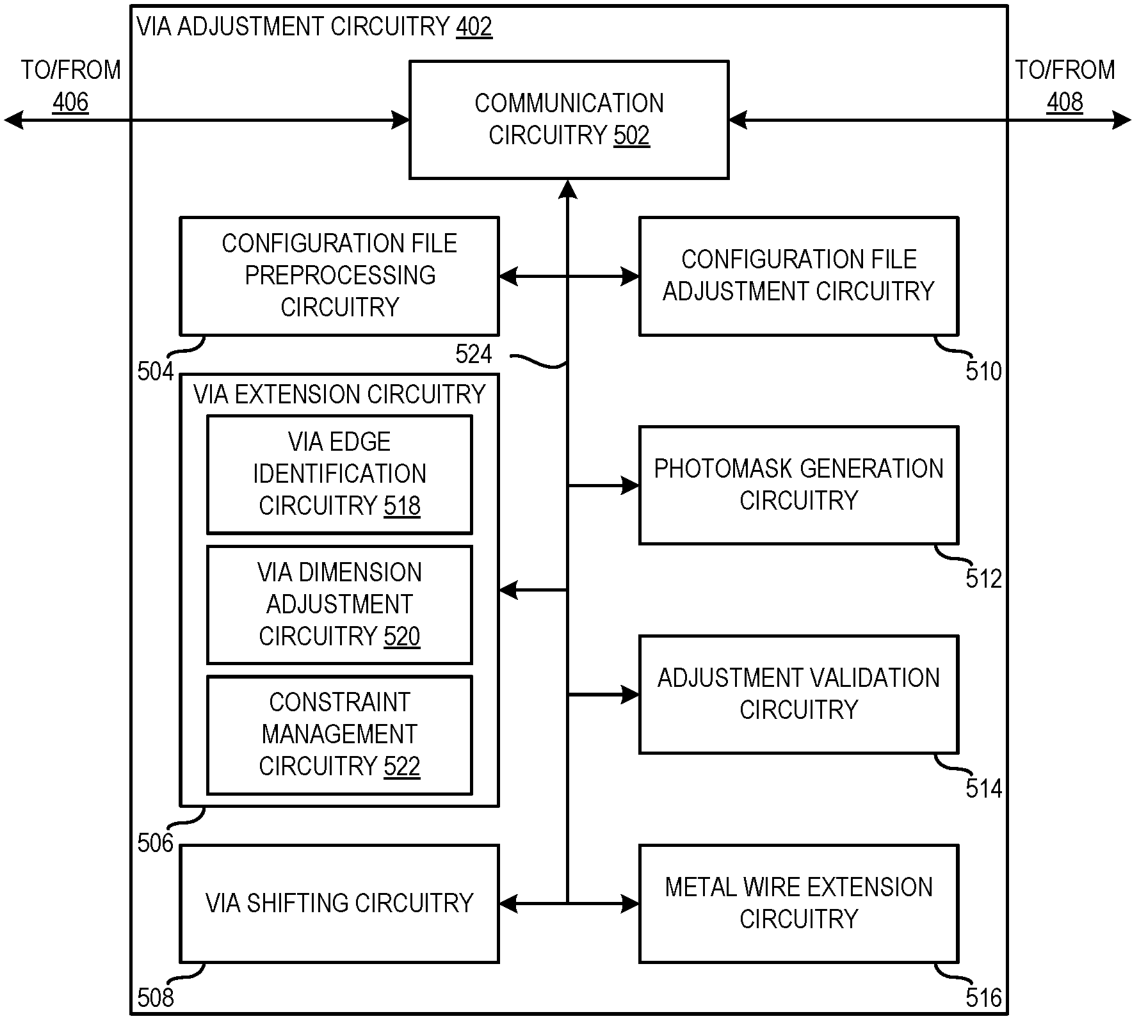
FIG. 5 is a block diagram illustrating an example implementation of the via adjustment circuitry of FIG. 4.

FIG. 5 is a block diagram illustrating an example implementation of the via adjustment circuitry 402 of FIG. 4. In the example of FIG. 5, the via adjustment circuitry 402 includes example communication circuitry 502, example configuration file preprocessing circuitry 504, example via extension circuitry 506, example via shifting circuitry 508, example configuration file adjustment circuitry 510, example photomask generation circuitry 512, example adjustment validation circuitry 514, and example metal wire extension circuitry 516. Additionally, the example via extension circuitry 506 includes example via edge identification circuitry 518, example via dimension adjustment circuitry 520, and example constraint management circuitry 522. In the example of FIG. 5, any of the communication circuitry 502, the configuration file preprocessing circuitry 504, the via extension circuitry 506, the via shifting circuitry 508, the configuration file adjustment circuitry 510, the photomask generation circuitry 512, the adjustment validation circuitry 514, the metal wire extension circuitry 516, the via edge identification circuitry 518, the via dimension adjustment circuitry 520, and/or the constraint management circuitry 522 can communicate via an example communication bus 524.

In the illustrated example of FIG. 5, the via adjustment circuitry 402 may be instantiated (e.g., creating an instance of, bring into being for any length of time, materialize, implement, etc.) by processor circuitry such as a central processing unit executing instructions. Additionally or alternatively, the via adjustment circuitry 402 of FIG. 5 may be instantiated (e.g., creating an instance of, bring into being for any length of time, materialize, implement, etc.) by an ASIC or an FPGA structured to perform operations corresponding to the instructions (e.g., operations corresponding to instructions). It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by microprocessor circuitry executing instructions to implement one or more virtual machines and/or containers.

In the illustrated example of FIG. 5, the communication circuitry 502 controls communication between the via adjustment circuitry 402 and other devices (e.g., connected directly and/or via the example network 406 of FIG. 4). For example, the communication circuitry 502 receives, obtains, and/or accesses a configuration file (e.g., from the endpoint device 404) corresponding to an integrated circuit to be fabricated from the network 406. Additionally or alternatively, the communication circuitry 502 outputs (e.g., transmits, causes transmission of, etc.) one or more photomasks (e.g., the one or more photomasks 412) to fabrication equipment (e.g., the fabrication equipment 408) for fabrication of the IC corresponding to a configuration file. Additionally, in some examples, the communication circuitry 502 transmits and/or causes transmission of a communication to the endpoint device 404 to inform a user of the endpoint device 404 that the IC corresponding to the configuration file 410 is in a queue to be, is being, and/or has been fabricated (e.g., based on feedback from the fabrication equipment 408). In some examples, the communication circuitry 502 is instantiated by processor circuitry executing communication instructions and/or configured to perform operations such as those represented by the flowchart of FIG. 11.

In some examples, the via adjustment circuitry 402 includes means for communicating. For example, the means for communicating may be implemented by the communication circuitry 502. In some examples, the communication circuitry 502 may be instantiated by processor circuitry such as the example processor circuitry 1412 of FIG. 14. For instance, the communication circuitry 502 may be instantiated by the example microprocessor 1500 of FIG. 15 executing machine executable instructions such as those implemented by at least blocks 1102 and 1132 of FIG. 11. In some examples, the communication circuitry 502 may be instantiated by hardware logic circuitry, which may be implemented by an ASIC, XPU, or the FPGA circuitry 1600 of FIG. 16 structured to perform operations corresponding to the machine readable instructions. Additionally or alternatively, the communication circuitry 502 may be instantiated by any other combination of hardware, software, and/or firmware. For example, the communication circuitry 502 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 5, the configuration file preprocessing circuitry 504 analyzes configuration files to determine which layers of a corresponding IC have been designed with flexible pitch design rules. Additionally, within each via layer of an IC, the configuration file preprocessing circuitry 504 determines whether vias of a via layer are within a threshold distance of an end of a metal wire in a layer above and/or a layer below the via layer. The configuration file preprocessing circuitry 504 identifies the layers and/or vias to other circuitry of the via adjustment circuitry 402 for further processing. In some examples, the configuration file preprocessing circuitry 504 is instantiated by processor circuitry executing the configuration file preprocessing instructions and/or configured to perform operations such as those represented by the flowcharts of FIGS. 11 and/or 13.

In some examples, the via adjustment circuitry 402 includes means for preprocessing. For example, the means for preprocessing may be implemented by the configuration file preprocessing circuitry 504. In some examples, the configuration file preprocessing circuitry 504 may be instantiated by processor circuitry such as the example processor circuitry 1412 of FIG. 14. For instance, the configuration file preprocessing circuitry 504 may be instantiated by the example microprocessor 1500 of FIG. 15 executing machine executable instructions such as those implemented by at least blocks 1104, 1108, 1120, and 1128 of FIG. 11 and/or at least blocks 1302, 1308, 1318, and 1320 of FIG. 13. In some examples, the configuration file preprocessing circuitry 504 may be instantiated by hardware logic circuitry, which may be implemented by an ASIC, XPU, or the FPGA circuitry 1600 of FIG. 16 structured to perform operations corresponding to the machine readable instructions. Additionally or alternatively, the configuration file preprocessing circuitry 504 may be instantiated by any other combination of hardware, software, and/or firmware. For example, the configuration file preprocessing circuitry 504 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 5, the via extension circuitry 506 computes dimensions by which to extend vias of a via layer to improve via coverage between vias and metal wires in metal layers above the via layer. For example, based on the configuration file preprocessing circuitry 504 determining that a metal layer above a via layer was designed with flexible pitch design rules, the via extension circuitry 506 computes dimensions by which to extend at least one via of the via layer. In this manner, the via extension circuitry 506 computes the dimension of via wings to be added to vias of a via layer.

As described above, a via layer is disposed between a first metal layer above the via layer and a second metal layer below the via layer. As such, an individual via of a via layer is disposed between a first metal wire of a first metal layer above the via layer and a second metal wire of a second metal layer below the via layer. In the example of FIG. 5, the via extension circuitry 506 computes the dimensions by which to extend a via based on at least one metal wire adjacent to the metal wire above the via, a via-to-via patterning constraint, and a via-to-metal shorting constraint for the metal layer below the via layer including the via. In this manner, the via extension circuitry 506 accounts for the shifting in positions and widths of metal wires above vias due to application of OPC techniques. In some examples, the via extension circuitry 506 is instantiated by processor circuitry executing via extension instructions and/or configured to perform operations such as those represented by the flowcharts of FIGS. 11, 12, and/or 13.

In some examples, the via adjustment circuitry 402 includes means for extending vias. For example, the means for extending vias may be implemented by the via extension circuitry 506. In some examples, the via extension circuitry 506 may be instantiated by processor circuitry such as the example processor circuitry 1412 of FIG. 14. For instance, the via extension circuitry 506 may be instantiated by the example microprocessor 1500 of FIG. 15 executing machine executable instructions such as those implemented by at least blocks 1106 and 1116 of FIG. 11, at least blocks 1202, 1204, 1206, 1208, 1210, and 1212 of FIG. 12, and/or at least block 1310 of FIG. 13. In some examples, the via extension circuitry 506 may be instantiated by hardware logic circuitry, which may be implemented by an ASIC, XPU, or the FPGA circuitry 1600 of FIG. 16 structured to perform operations corresponding to the machine readable instructions. Additionally or alternatively, the via extension circuitry 506 may be instantiated by any other combination of hardware, software, and/or firmware. For example, the via extension circuitry 506 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

Figure 6A:
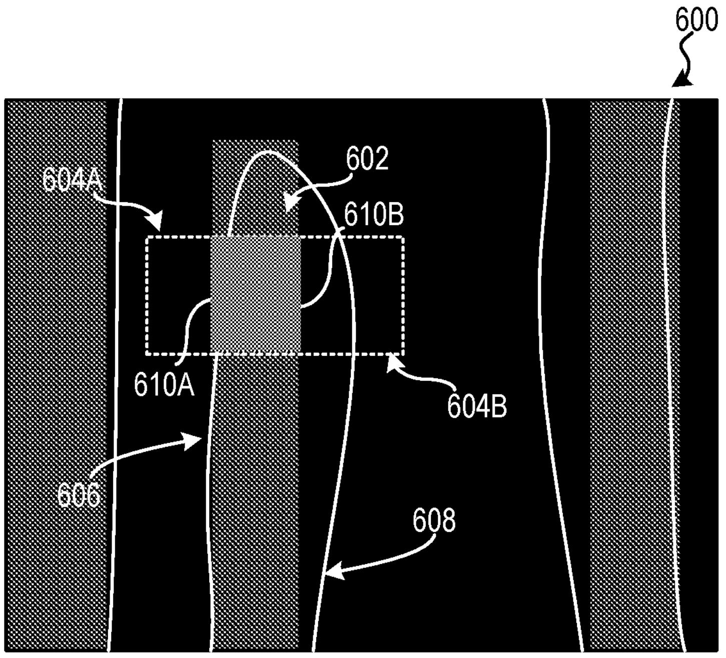
FIG. 6A illustrates a top view of a portion of an example electronic layout of an IC including an example via with example wing extensions.

FIG. 6A illustrates a top view of a portion of an example electronic layout 600 of an IC including an example via 602 with example wing extensions 604A-B. In the example of FIG. 6A, the portion of the electronic layout 600 includes the example via 602, the example wing extensions 604A-B, and example metal wire 606 above the via 602. In the example of FIG. 6A, an example representation 608 of the metal wire 606 is superimposed on the portion of the electronic layout 600. The representation 608 of the metal wire 606 is indicative of a predicted position and width of the metal wire 606 after application of OPC techniques and any subsequent process window optimization techniques. The ML model executed by the via adjustment circuitry 402 may be implemented to predict positions and widths of metal wires in metal layers above via layers.

In the illustrated example of FIG. 6A, the via extension circuitry 506 computes dimensions of an example first wing 604A to add to a first edge 610A of the via 602. Additionally, the via extension circuitry 506 computes dimensions of an example second wing 604B to add to a second edge 610B of the via 602. As illustrated in FIG. 6A, the via extension circuitry 506 extends, in this example, the second wing 604B farther than the first wing 604A. For example, the via extension circuitry 506 extends the second wing 604B farther because the predicted position and width of the metal wire 606 indicate that the edge of the metal wire 606 aligned with the second edge 610B of the via 602 will shift when the metal wire 606 is fabricated but that the edge of the metal wire 606 on the first edge 610A of the via 602 will not shift.

Figure 6B:
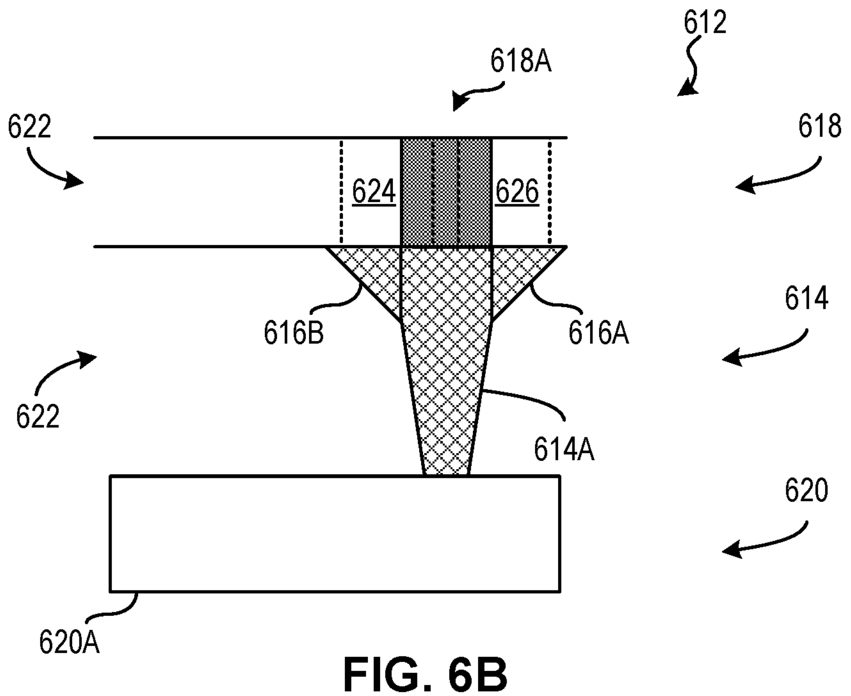
FIG. 6B illustrates a cross-sectional side view of an example IC depicting an example via layer including a first via with example wing extensions.

FIG. 6B illustrates a cross-sectional side view of an example IC 612 depicting an example via layer 614 including a first via 614A with example wing extensions 616A-B. The IC 612 of FIG. 6B includes the example via layer 614, an example first metal layer 618, and an example second metal layer 620. In the example of FIG. 6B, the first metal layer 618 includes an example first metal wire 618A. In the example of FIG. 6B, the example second metal layer 620 includes an example second metal wire 620A.

In the illustrated example of FIG. 6B, the first via 614A includes an example first wing extension 616A and an example second wing extension 616B. In the example FIG. 6B, the first via 614A (including the first wing extension 616A and the second wing extension 616B), the first metal wire 618A, and the second metal wire 620A are embedded in example dielectric 622. The example first metal layer 618 of the IC 612 is above the example via layer 614. Additionally, in the example of FIG. 6B, the second metal layer 620 of the IC 612 is below the via layer 614. As such, in the example of FIG. 6B, the first via 614A is a TSV. The functional purpose of the first via 614A in the IC 612 is to connect the first metal wire 618A and the second metal wire 620A.

In the illustrated examples of FIG. 6B, solid lines illustrate positions of components in the IC 612 before OPC techniques have been applied to metal layers and dashed lines illustrate positions of metal wires in the IC 612 that have been shifted, if any, after application of OPC techniques. For example, in FIG. 6B, an example first box 624 illustrates a first possible shifted position of the first metal wire 618A after application of OPC techniques to the first metal layer 618 and an example second box 626 illustrates a second possible shifted position of the first metal wire 618A after application of OPC techniques to the first metal layer 618. In the example of FIG. 6B, despite the possible shifted positions of the first metal wire 618A (e.g., represented by the first box 624 and the second box 626) via coverage with respect to the first via 614A is not reduced due to the first wing extension 616A and/or the second wing extension 616B.

Returning to FIG. 5, as described above, the via extension circuitry 506 includes the via edge identification circuitry 518, the via dimension adjustment circuitry 520, and the constraint management circuitry 522. In examples disclosed herein, edges of a via that are aligned with edges of a metal wire above the via are referred to as self-aligned edges. In the example of FIG. 5, for self-aligned edges of a via, the via edge identification circuitry 518 identifies one or more edges of the via that are eligible for extension based on a distance between the via and a second metal wire adjacent to the first metal wire and in the same metal layer as the first metal wire.

Generally, a self-aligned edge of a via will be eligible for extension. However, in some examples, self-aligned edges of a via may not be eligible for extension. For example, if a self-aligned edge of a via is within a threshold distance of (e.g., too close to) a first metal wire adjacent to a second metal wire above the via, then the via edge identification circuitry 518 identifies the self-aligned edge as ineligible for extension. In the example of FIG. 5, the via dimension adjustment circuitry 520 extends the dimensions of eligible edges by a predetermined amount. Additionally, the constraint management circuitry 522 determines whether the wings (e.g., the edges of the via with extended dimensions) of a via violate at least one of the via-to-via patterning constraint or a via-to-metal shorting constraint for a metal layer below a via layer in which the via is disposed. The via dimension adjustment circuitry 520 adjusts the wings (e.g., reduces the dimension of the edges of the via) to satisfy violated ones of the constraints. In this manner, the via extension circuitry 506 ensures robust integrated patterning by restricting the amount of additional wing extension in certain geometric cases (e.g., subject to the constraints).

Figure 7A:
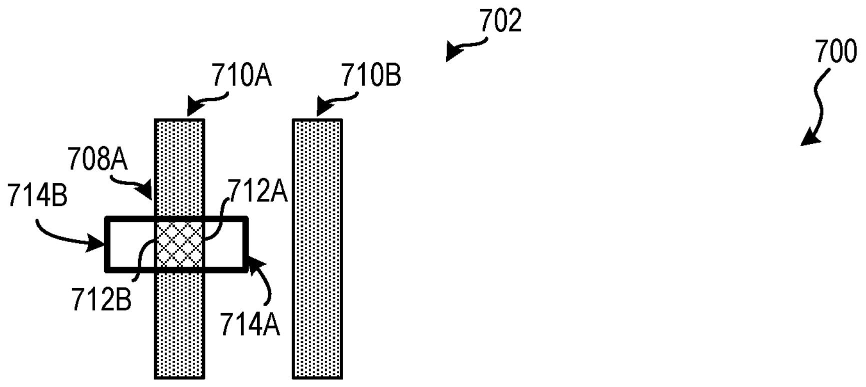
FIGS. 7A, 7B, and 7C illustrate example top views of example portions of an example electronic layout demonstrating example constraints imposed on wing extension adjustments made by the via dimension adjustment circuitry of FIG. 5.
Figure 7B:
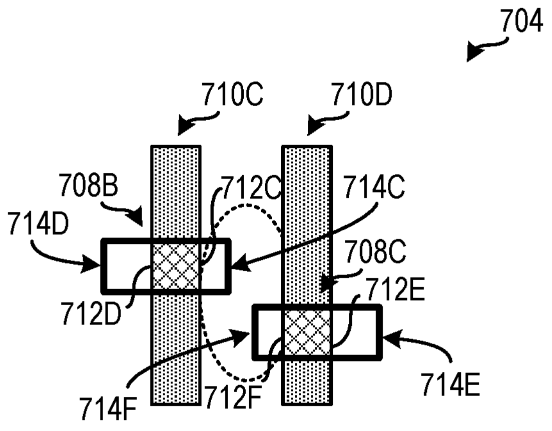
Figure 7C:
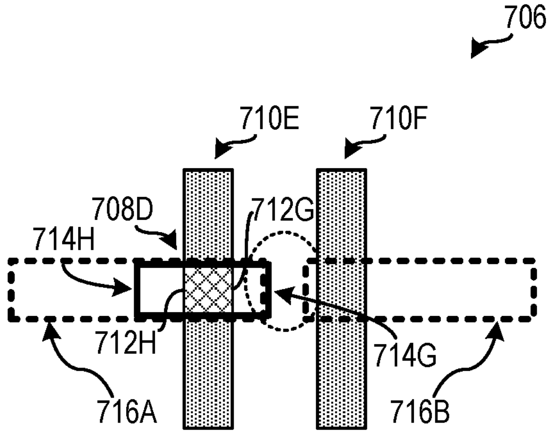

For example, FIGS. 7A, 7B, and 7C illustrate example top views of example portions of an example electronic layout 700 demonstrating example constraints imposed on wing extension adjustments made by the via dimension adjustment circuitry 520 of FIG. 5. FIG. 7A illustrates a top view of an example first portion 702, FIG. 7B illustrates a top view of an example second portion 704, and FIG. 7C illustrates a top view of an example third portion 706. In the example of FIG. 7A, the first portion 702 of the electronic layout 700 includes an example first via 708A, an example first metal wire 710A above the first via 708A, and an example second metal wire 710B.

In the illustrated example of FIG. 7, for self-aligned edges of the first via 708A (e.g., self-aligned with respect to the first metal wire 710A), the via edge identification circuitry 518 identifies a first edge 712A and a second edge 712B of the first via 708A as eligible for extension based on a distance between the first via 708A and the second metal wire 710B. Based on the first edge 712A being identified as eligible for extension, the via dimension adjustment circuitry 520 extends the dimensions of the first edge 712A by a predetermined amount to generate an example first wing 714A. Additionally, based on the second edge 712B being identified as eligible for extension, the via dimension adjustment circuitry 520 extends the dimensions of the second edge 712B by a predetermined amount to generate an example second wing 714B.

The example constraint management circuitry 522 determines whether the first wing 714A and/or the second wing 714B (e.g., the extended dimension of the first edge 712A and/or the second edge 712B) of the first via 708A violate the via-to-via patterning constraint. In examples disclosed herein, a via-to-via patterning constraint refers to a threshold amount of resistance between two adjacent vias of a via layer. For example, a first via of a via layer violates the via-to-via patterning constraint if one or more wings added to the first via are within a threshold distance of a second via of the via layer after wing extension has been applied to the first via and/or the second via. In examples disclosed herein, the via-to-via patterning constraint is determined based on testing resistance between vias during calibration of fabrication equipment. As no vias are present in the first portion 702 of the electronic layout 700 other than the first via 708A, the constraint management circuitry 522 determines that the first wing 714A and the second wing 714B satisfy the via-to-via patterning constraint.

Additionally, the constraint management circuitry 522 determines whether the first wing 714A and/or the second wing 714B (e.g., the extended dimension of the first edge 712A and/or the second edge 712B) of the first via 708A violate a via-to-metal shorting constraint for a metal layer below a via layer in which the first via 708A is disposed. In examples disclosed herein, a via-to-metal shorting constraint refers to a threshold distance between a via and a metal wire adjacent to the metal wires above and/or below the via. For example, a via in a via layer may violate the via-to-metal shorting constraint for a metal layer below the via layer if one or more wings added to the via are within a threshold distance of a metal wire in the metal layer below the via layer after wing extension has been applied to the via.

In examples disclosed herein, the via-to-metal shorting constraint is based on the fabrication equipment and is determined based on electrical testing of via layers and metal layers above and/or below the via layers. In examples disclosed herein, a via may be subject to a via-to-metal shorting constraint for a metal layer above the via layer including the via (e.g., a via-to-metal-above shorting constraint) and a via-to-metal shorting constraint for a metal layer below the via layer including the via (e.g., a via-to-metal-below shorting constraint). Via-to-metal-above shorting constraints may be different than via-to-metal-below shorting constraints. As the first portion 702 of the electronic layout 700 does not include any metal wires below the first via 708A, the constraint management circuitry 522 determines that the first wing 714A and the second wing 714B satisfy the via-to-metal-below shorting constraint. Thus, as the first wing 714A and the second wing 714B satisfy the via-to-via patterning constraint and the via-to-metal-below shorting constraint (and therefore are not further adjusted by the via dimension adjustment circuitry 520), the first wing 714A and the second wing 714B are considered fully extended wings.

In the illustrated example of FIG. 7B, the second portion 704 of the electronic layout 700 includes an example second via 708B, an example third via 708C, an example third metal wire 710C above the second via 708B, and an example fourth metal wire 710D above the third via 708C. For self-aligned edges of the second via 708B (e.g., self-aligned with respect to the third metal wire 710C), the via edge identification circuitry 518 identifies a third edge 712C and a fourth edge 712D of the second via 708B as eligible for extension based on a distance between the second via 708B and the fourth metal wire 710D. Additionally, for self-aligned edges of the third via 708C (e.g., self-aligned with respect to the fourth metal wire 710D), the via edge identification circuitry 518 identifies a fifth edge 712E and a sixth edge 712F of the third via 708C as eligible for extension based on a distance between the third via 708C and the third metal wire 710C.

Based on the third edge 712C being identified as eligible for extension, the via dimension adjustment circuitry 520 extends the dimensions of the third edge 712C by a predetermined amount to generate an example third wing 714C. Additionally, based on the fourth edge 712D being identified as eligible for extension, the via dimension adjustment circuitry 520 extends the dimensions of the fourth edge 712D by the predetermined amount to generate an example fourth wing 714D. The via dimension adjustment circuitry 520 also extends the dimensions of the fifth edge 712E by the predetermined amount to generate an example fifth wing 714E based on the fifth edge 712E being identified as eligible for extension. Based on the sixth edge 712F being identified as eligible for extension, the via dimension adjustment circuitry 520 extends the dimensions of the sixth edge 712F by the predetermined amount to generate an example sixth wing 714F.

Additionally, the example constraint management circuitry 522 determines whether the third wing 714C and/or the fourth wing 714D (e.g., the extended dimension of the third edge 712C and/or the fourth edge 712D) of the second via 708B violate the via-to-via patterning constraint. The example constraint management circuitry 522 also determines whether the fifth wing 714E and/or the sixth wing 714F (e.g., the extended dimension of the fifth edge 712E and/or the sixth edge 712F) of the third via 708C violate the via-to-via patterning constraint. In the example of FIG. 7B, the third wing 714C of the second via 708B is within a threshold distance of the sixth wing 714F of the third via 708C (e.g., the corner of the third wing 714C is too close to the corner of the sixth wing 714F). As such, the constraint management circuitry 522 determines that the third wing 714C and the sixth wing 714F violate the via-to-via patterning constraint.

Accordingly, the via dimension adjustment circuitry 520 adjusts the third wing 714C and the sixth wing 714F (e.g., adjust the dimension of the third edge 712C of the second via 708B and the sixth edge 712F of the third via 708C) to satisfy the via-to-via patterning constraint. For example, the predetermined amount by which the third edge 712C of the second via 708B and the sixth edge 712F of the third via 708C were initially extended is divided into two or more equivalent intervals (e.g., two or more bins). To adjust the third wing 714C and the sixth wing 714F to satisfy the via-to-via patterning constraint, the example via dimension adjustment circuitry 520 reduces the amount by which the third edge 712C of the second via 708B is extended by one or more intervals (e.g., by one or more bins) and reduces the amount by which the sixth edge 712C of the third via 708C is extended by one or more intervals (e.g., by one or more bins). As such, the third wing 714C and the sixth wing 714F are considered partially extended wings.

The constraint management circuitry 522 also determines whether the third wing 714C and/or the fourth wing 714D (e.g., the extended dimension of the third edge 712C and/or the fourth edge 712D) of the second via 708B violate a via-to-metal-below shorting constraint. Additionally, the example constraint management circuitry 522 determines whether the fifth wing 714E and/or the sixth wing 714F (e.g., the extended dimension of the fifth edge 712E and/or the sixth edge 712F) of the third via 708C violate the via-to-metal-below shorting constraint. As the second portion 704 of the electronic layout 700 does not include any metal wires below the second via 708B and/or the third via 708C, the constraint management circuitry 522 determines that the third wing 714C, the fourth wing 714D, the fifth wing 714E, and the sixth wing 714F satisfy the via-to-metal-below shorting constraint.

In the illustrated example of FIG. 7C, the third portion 706 of the electronic layout 700 includes an example fourth via 708D, an example fifth metal wire 710E above the fourth via 708D, an example sixth metal wire 710F, an example first metal wire 716A below the fourth via 708D, and an example second metal wire 716B. In the example of FIG. 7C, the second metal wire 716B is adjacent to the first metal wire 716A (in the same layer). For self-aligned edges of the fourth via 708D (e.g., self-aligned with respect to the fifth metal wire 710E), the via edge identification circuitry 518 identifies a seventh edge 712G and an eighth edge 712H of the fourth via 708D as eligible for extension based on a distance between the fourth via 708D and the sixth metal wire 710F. Based on the seventh edge 712G being identified as eligible for extension, the via dimension adjustment circuitry 520 extends the dimensions of the seventh edge 712G by a predetermined amount to generate an example seventh wing 714G.

Additionally, based on the eighth edge 712H being identified as eligible for extension, the via dimension adjustment circuitry 520 extends the dimensions of the eight edge 712H by the predetermined amount to generate an example eighth wing 714H. The example constraint management circuitry 522 determines whether the seventh wing 714G and/or the eighth wing 714H (e.g., the extended dimension of the seventh edge 712G and/or the eighth edge 712H) of the fourth via 708D violate the via-to-via patterning constraint. As no vias are present in the third portion 706 of the electronic layout 700 other than the fourth via 708D, the constraint management circuitry 522 determines that the seventh wing 714G and the eighth wing 714H satisfy the via-to-via patterning constraint.

The constraint management circuitry 522 also determines whether the seventh wing 714G and/or the eighth wing 714H (e.g., the extended dimension of the seventh edge 712G and/or the eighth edge 712H) of the fourth via 708D violate a via-to-metal-below shorting constraint. In the example of FIG. 7C, the seventh wing 712G of the fourth via 708D is within a threshold distance of the second metal wire 716B, which is adjacent to the first metal wire 716A that is below the fourth via 708D (e.g., the seventh wing 714G is too close to the second metal wire 716B). As such, the constraint management circuitry 522 determines that the seventh wing 714G violates the via-to-metal-below shorting constraint. Accordingly, the via dimension adjustment circuitry 520 adjusts the seventh wing 714G (e.g., adjust the dimension of the seventh edge 712G of the fourth via 708D) to satisfy the via-to-metal-below shorting constraint. For example, the predetermined amount by which the seventh edge 712G of the fourth via 708D was initially extended is divided into two or more equivalent intervals (e.g., two or more bins). To adjust the seventh wing 714G to satisfy the via-to-metal-below shorting constraint, the example via dimension adjustment circuitry 520 reduces the amount by which the seventh edge 712G of the fourth via 708D is extended by one or more intervals (e.g., by one or more bins). As such, the seventh wing 714G is considered a partially extended wing.

In examples disclosed herein, via wings are fabricated along the edges of vias that are self-aligned to the edges of metal wires above the vias prior to adjustment of the vias based on the application of OPC techniques. For example, via layers that utilize wing extension are filled with metal using a self-aligned dual damascene process. As described above, a via may be implemented by a hole in a dielectric fill of an IC that allows for a metal wire above the via to connect to a metal wire below the via. Additionally, a wing added to a via may be implemented by a sloped cavity adjacent to the via. To fill a via of an IC according to the dual damascene process, a trench where the metal wire below the via is to be placed is patterned on the IC and the trench is filled with metal (e.g., copper) or another conducting material. After the trench for the metal wire below the via has been filled, a CMP machine may be applied to a wafer including the IC to smooth the metal wire below the via to improve integration of the metal wire. Then, the via (including any added wings) and the trench where the metal wire above the via is to be placed is patterned on the IC. Subsequently, the trench above the via and the via are filled with metal (e.g., copper) or another conducting material. After the trench for the metal wire above the via and the via have been filled, a CMP machine may be applied to the wafer including the IC to smooth the metal wire above the via to improve integration of the metal wire.

In this manner, the via wings (e.g., cavities adjacent to the via) operate to funnel the metal used to fill the trench above the via into the via. Thus, trenches that are misaligned with vias after application of OPC techniques are nonetheless coupled to the vias as a result of the wings. Additionally, example wings disclosed herein are sacrificial. That is, wings will be visible (e.g., via an SEM) during intermediate stages of fabrication, but will not be visible after application of the dual damascene process as the wings will be filled with conducting material. As described above, example via wing extension disclosed herein provides significant benefits to mitigating yield and performance risks and mitigates defects during the via gap fill process. For example, FIGS. 8A and 8B are SEM images illustrating overlap between vias and metal wires of an IC with and without wing extension adjustment.

Figure 8A:
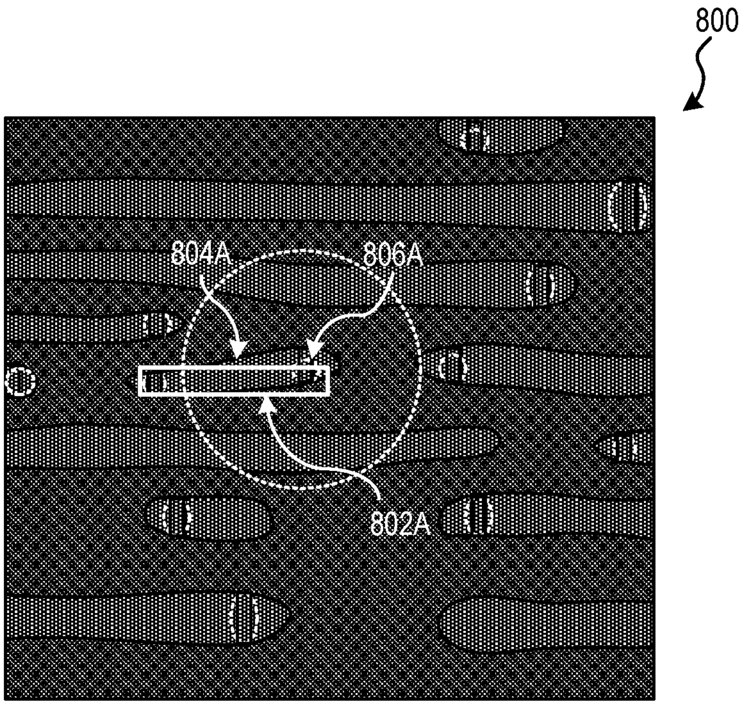
FIGS. 8A and 8B are SEM images illustrating overlap between example vias and example metal wires with and without wing extension adjustment.

FIG. 8A is an SEM image 800 illustrating overlap between an example vias and example metal wires without wing extension adjustment. The SEM image 800 of FIG. 8A illustrates an example first position 802A of a metal wire to be embedded in a metal layer of a semiconductor as defined in a configuration file, an example second position 804A of the metal wire as embedded in the metal layer of the semiconductor after application of OPC techniques, and an example third position 806A of a via as embedded in a via layer of the semiconductor below the metal layer. As demonstrated in FIG. 8A, there is a marginal overlap between the third position 806A of the via as embedded in the via layer of the semiconductor and the second position 804A of the metal wire as embedded in the metal layer of the semiconductor. For example, the second position 804A of the metal wire in the metal layer after application of OPC techniques causes the metal wire to have reduced overlap with the via (e.g., at the third position 806A) in the via layer below the metal layer as compared to the overlap of the metal wire at the first position 802A as defined in the configuration file. As such, the via at the third position 806A is subject to reduced via coverage (e.g., and therefore an increased risk of being disconnected (e.g., open)).

Figure 8B:
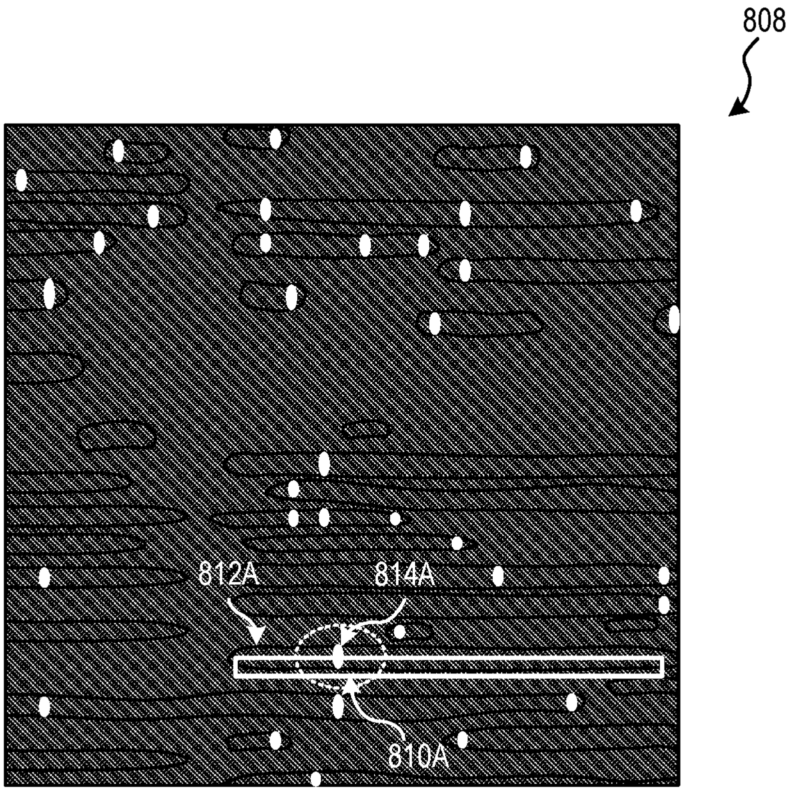

FIG. 8B is an SEM image 808 illustrating overlap between an example vias and example metal wires with wing extension adjustment. The SEM image 808 of FIG. 8B illustrates an example first position 810A of a metal wire to be embedded in a metal layer of a semiconductor as defined in a configuration file, an example second position 812A of the metal wire as embedded in the metal layer of the semiconductor after application of OPC techniques, and an example third position 814A of a via including one or more wings as embedded in a via layer of the semiconductor below the metal layer. As demonstrated in FIG. 8B, there is improved overlap between the third position 814A of the via as embedded in the via layer of the semiconductor and the second position 812A of the metal wire as embedded in the metal layer of the semiconductor. For example, despite the shifting of the metal wire in the metal layer from the first position 810A as defined in the configuration file to the second position 812A as embedded in the metal layer after application of OPC techniques, the via (including one or more wings) at the third position 814A has improved overlap with the metal wire.

Returning to FIG. 5, as described above, the via extension circuitry 506 includes the via edge identification circuitry 518, the via dimension adjustment circuitry 520, and the constraint management circuitry 522. In some examples, the via edge identification circuitry 518 is instantiated by processor circuitry executing via edge identification instructions and/or configured to perform operations such as those represented by the flowchart of FIG. 12. In some examples, the via dimension adjustment circuitry 520 is instantiated by processor circuitry executing via dimension adjustment instructions and/or configured to perform operations such as those represented by the flowchart of FIG. 12. In some examples, the constraint management circuitry 522 is instantiated by processor circuitry executing constraint management instructions and/or configured to perform operations such as those represented by the flowchart of FIG. 12.

In some examples, the via adjustment circuitry 402 includes means for identifying edges. For example, the means for identifying edges may be implemented by the via edge identification circuitry 518. In some examples, the via edge identification circuitry 518 may be instantiated by processor circuitry such as the example processor circuitry 1412 of FIG. 14. For instance, the via edge identification circuitry 518 may be instantiated by the example microprocessor 1500 of FIG. 15 executing machine executable instructions such as those implemented by at least block 1202 of FIG. 12. In some examples, the via edge identification circuitry 518 may be instantiated by hardware logic circuitry, which may be implemented by an ASIC, XPU, or the FPGA circuitry 1600 of FIG. 16 structured to perform operations corresponding to the machine readable instructions. Additionally or alternatively, the via edge identification circuitry 518 may be instantiated by any other combination of hardware, software, and/or firmware. For example, the via edge identification circuitry 518 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

In some examples, the via adjustment circuitry 402 includes means for adjusting dimensions. For example, the means for adjusting dimensions may be implemented by the via dimension adjustment circuitry 520. In some examples, the via dimension adjustment circuitry 520 may be instantiated by processor circuitry such as the example processor circuitry 1412 of FIG. 14. For instance, the via dimension adjustment circuitry 520 may be instantiated by the example microprocessor 1500 of FIG. 15 executing machine executable instructions such as those implemented by at least blocks 1204, 1208, and 1212 of FIG. 12. In some examples, the via dimension adjustment circuitry 520 may be instantiated by hardware logic circuitry, which may be implemented by an ASIC, XPU, or the FPGA circuitry 1600 of FIG. 16 structured to perform operations corresponding to the machine readable instructions. Additionally or alternatively, the via dimension adjustment circuitry 520 may be instantiated by any other combination of hardware, software, and/or firmware. For example, the via dimension adjustment circuitry 520 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

In some examples, the via adjustment circuitry 402 includes means for managing constraints. For example, the means for managing constraints may be implemented by the constraint management circuitry 522. In some examples, the constraint management circuitry 522 may be instantiated by processor circuitry such as the example processor circuitry 1412 of FIG. 14. For instance, the constraint management circuitry 522 may be instantiated by the example microprocessor 1500 of FIG. 15 executing machine executable instructions such as those implemented by at least blocks 1206 and 1210 of FIG. 12. In some examples, the constraint management circuitry 522 may be instantiated by hardware logic circuitry, which may be implemented by an ASIC, XPU, or the FPGA circuitry 1600 of FIG. 16 structured to perform operations corresponding to the machine readable instructions. Additionally or alternatively, the constraint management circuitry 522 may be instantiated by any other combination of hardware, software, and/or firmware. For example, the constraint management circuitry 522 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 5, the via shifting circuitry 508 predicts, with an ML model (e.g., an XGBoost model), a width and a position of a metal wire below a via after application of process window optimization techniques (e.g., after application of OPC techniques and any subsequent process window optimization techniques). As described above, in the example of FIG. 5, the configuration file preprocessing circuitry 504 determines which layers of a corresponding IC have been designed with flexible pitch design rules. Based on the configuration file preprocessing circuitry 504 determining that a metal layer below a via layer was designed with flexible pitch design rules, the via shifting circuitry 508 predicts, with an ML model, a width and a position of a metal wire in the metal layer below a via in the via layer after application of OPC techniques and any subsequent process window optimization techniques.

During development of the ML model (e.g., the XGBoost model) implemented by the via shifting circuitry 508, an alternate ML model was developed to apply OPC techniques to metal layers and via layer at the same time (e.g., during the same processing cycle). However, the alternate ML model generates very complex multi-layer OPC operations and simultaneously links several metal layers and via layers together during fabrication which results in delays for availability of photomasks. The example ML model (e.g., the XGBoost model) implemented by the via shifting circuitry 508 avoids the complexity and delays while providing similar accuracy to the alternate ML model.

Additionally, in the example of FIG. 5, the via shifting circuitry 508 computes a shifted position of the via based on at least one of the width and/or the position of the metal wire below the via and/or the dimensions by which to extend the via, as determined by the via extension circuitry 506. In the example of FIG. 5, the via shifting circuitry 508 determines whether the shifted position of the via violates at least one of the via-to-via patterning constraint, the via-to-metal shorting constraint for a metal layer above the via layer, and/or a via-to-metal shorting constraint for a metal layer below the via layer. Additionally, at least one of the via extension circuitry 506 or the via shifting circuitry 508 adjust at least one of the shifted position of the via and/or the dimensions by which to extend the via based on violated ones of the via-to-via patterning constraint, the via-to-metal shorting constraint for a metal layer above the via layer, and/or a via-to-metal shorting constraint for a metal layer below the via layer.

For example, the via extension circuitry 506 adjusts the dimensions by which to extend the via based on violated ones of the constraints. Additionally or alternatively, the via shifting circuitry 508 adjusts the shifted position of the via based on violated ones of the constraints. In this manner, the via shifting circuitry 508 improves via-to-metal overlap between vias and the metal wires below the vias and reduces the risk of unintended shorting between vias and metal wires below the vias. In some examples, the via shifting circuitry 508 is instantiated by processor circuitry executing via shifting instructions and/or configured to perform operations such as those represented by the flowcharts of FIGS. 11 and/or 13.

In some examples, the via adjustment circuitry 402 includes means for shifting. For example, the means for shifting may be implemented by the via shifting circuitry 508. In some examples, the via shifting circuitry 508 may be instantiated by processor circuitry such as the example processor circuitry 1412 of FIG. 14. For instance, the via shifting circuitry 508 may be instantiated by the example microprocessor 1500 of FIG. 15 executing machine executable instructions such as those implemented by at least blocks 1110, 1112, 1114, and 1116 of FIG. 11 and/or at least blocks 1312 or 1314 of FIG. 13. In some examples, the via shifting circuitry 508 may be instantiated by hardware logic circuitry, which may be implemented by an ASIC, XPU, or the FPGA circuitry 1600 of FIG. 16 structured to perform operations corresponding to the machine readable instructions. Additionally or alternatively, the via shifting circuitry 508 may be instantiated by any other combination of hardware, software, and/or firmware. For example, the via shifting circuitry 508 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 5, the configuration file adjustment circuitry 510 adjusts configuration files. For example, based on at least one of the dimensions by which to extend a via (as computed by the via extension circuitry 506) and/or the shifted position of the via (as determined by the via shifting circuitry 508), the configuration file adjustment circuitry 510 adjusts the via in the configuration file. In some examples, the configuration file adjustment circuitry 510 is instantiated by processor circuitry executing configuration file adjustment instructions and/or configured to perform operations such as those represented by the flowcharts of FIGS. 11 and/or 13.

In some examples, the via adjustment circuitry 402 includes means for adjusting configuration files. For example, the means for adjusting configuration files may be implemented by the configuration file adjustment circuitry 510. In some examples, the configuration file adjustment circuitry 510 may be instantiated by processor circuitry such as the example processor circuitry 1412 of FIG. 14. For instance, the configuration file adjustment circuitry 510 may be instantiated by the example microprocessor 1500 of FIG. 15 executing machine executable instructions such as those implemented by at least block 1118 of FIG. 11 and/or at least block 1316 of FIG. 13. In some examples, the configuration file adjustment circuitry 510 may be instantiated by hardware logic circuitry, which may be implemented by an ASIC, XPU, or the FPGA circuitry 1600 of FIG. 16 structured to perform operations corresponding to the machine readable instructions. Additionally or alternatively, the configuration file adjustment circuitry 510 may be instantiated by any other combination of hardware, software, and/or firmware. For example, the configuration file adjustment circuitry 510 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 5, the photomask generation circuitry 512 generates one or more photomasks for via layers and metal layers on an IC. For example, the photomask generation circuitry 512 generates photomasks for via layers of an IC and incorporates into the photomasks, the shifted positions of vias in the via layers and process window optimization techniques for the via layers. For example, the photomasks generation circuitry 512 generates a photomask for a via layer based on vias with one or more wings as computed by the via extension circuitry 506, positions as shifted by the via shifting circuitry 508, and application of OPC techniques to the via layer.

As described further herein, vias that are positioned near (e.g., within a threshold distance of) an end of a metal wire present a risk of being disconnected (e.g., open) due to the tendency of OPC techniques to result in tapered ends of metal wires. In the example of FIG. 5, after application of process window optimization techniques and via aware corrections at ends of metal wires in metal layers above via layers, the photomask generation circuitry 512 generates photomasks for the metal layers. Additionally, after application of process window optimization techniques and via aware corrections at ends of metal wires in metal layers below via layers, the photomask generation circuitry 512 generates photomasks for the metal layers. In some examples, the photomask generation circuitry 512 is instantiated by processor circuitry executing photomask generation instructions and/or configured to perform operations such as those represented by the flowchart of FIG. 11.

In some examples, the via adjustment circuitry 402 includes means for generating photomasks. For example, the means for generating photomasks may be implemented by the photomask generation circuitry 512. In some examples, the photomask generation circuitry 512 may be instantiated by processor circuitry such as the example processor circuitry 1412 of FIG. 14. For instance, the photomask generation circuitry 512 may be instantiated by the example microprocessor 1500 of FIG. 15 executing machine executable instructions such as those implemented by at least blocks 1122, 1124, and 1126 of FIG. 11. In some examples, the photomask generation circuitry 512 may be instantiated by hardware logic circuitry, which may be implemented by an ASIC, XPU, or the FPGA circuitry 1600 of FIG. 16 structured to perform operations corresponding to the machine readable instructions. Additionally or alternatively, the photomask generation circuitry 512 may be instantiated by any other combination of hardware, software, and/or firmware. For example, the photomask generation circuitry 512 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 5, the adjustment validation circuitry 514 validates via coverage and via-to-metal shorting metrics based the shifted positions of vias in via layers of an IC. For example, after the via shifting circuitry 508 determines shifted positions of vias in a via layer and OPC techniques (and/or subsequent process window optimization techniques) have been applied to metal layers, the adjustment validation circuitry 514 validates via coverage metrics and/or via-to-metal shorting metrics for vias. In some examples, application of OPC techniques to metal layers are based on the shifted positions of vias in via layers of an IC.

To validate via coverage metrics and/or via-to-metal shorting metrics, the adjustment validation circuitry 514 performs a contour-based check (CBC) between positions of vias as computed by the via shifting circuitry 508 and positions of metal wires as determined by OPC techniques (and/or subsequent process window optimization techniques). If via coverage metrics and/or via-to-metal shorting determined by the CBC do not satisfy a threshold value, the adjustment validation circuitry 514 adjusts the photomasks for metal layers based on the actual positions of vias (e.g., based on the shifted positions of vias computed by the via shifting circuitry 508). In this manner, examples disclosed herein feedback the shifted positions of vias to improve OPC metrology when computing via-to-metal overlap. In some examples, the adjustment validation circuitry 514 is instantiated by processor circuitry executing adjustment validation instructions and/or configured to perform operations such as those represented by the flowchart of FIG. 11.

In some examples, the via adjustment circuitry 402 includes means for validating adjustments. For example, the means for validating adjustments may be implemented by the adjustment validation circuitry 514. In some examples, the adjustment validation circuitry 514 may be instantiated by processor circuitry such as the example processor circuitry 1412 of FIG. 14. For instance, the adjustment validation circuitry 514 may be instantiated by the example microprocessor 1500 of FIG. 15 executing machine executable instructions such as those implemented by at least block 1130 of FIG. 11. In some examples, the adjustment validation circuitry 514 may be instantiated by hardware logic circuitry, which may be implemented by an ASIC, XPU, or the FPGA circuitry 1600 of FIG. 16 structured to perform operations corresponding to the machine readable instructions. Additionally or alternatively, the adjustment validation circuitry 514 may be instantiated by any other combination of hardware, software, and/or firmware. For example, the adjustment validation circuitry 514 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

Figure 9:
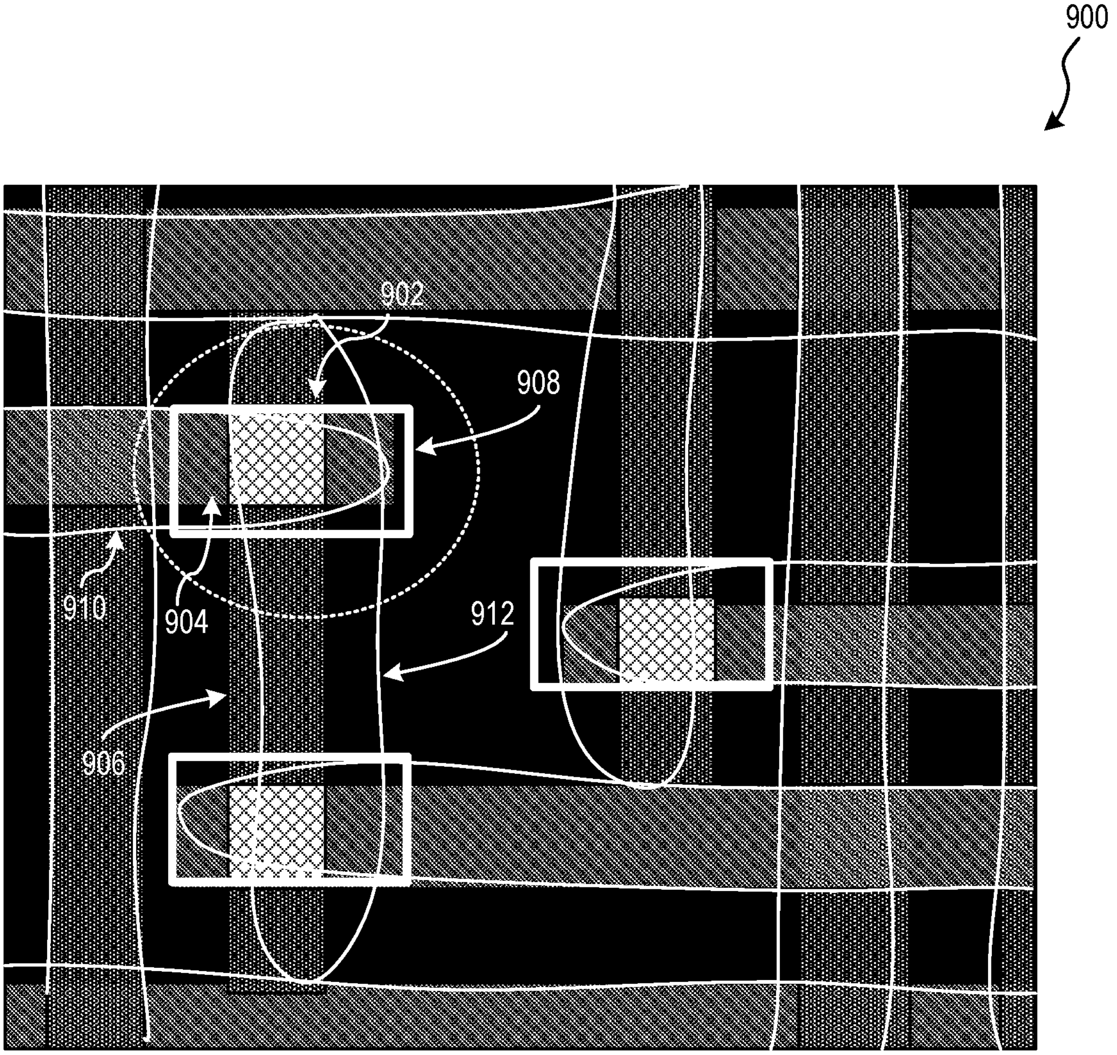
FIG. 9 illustrates a top view of a portion of an example electronic layout of an IC including an example via near an example of an example first metal wire below the via.

FIG. 9 illustrates a top view of a portion of an example electronic layout 900 of an IC including an example via 902 near an example end of an example first metal wire 904 below the via 902. In the example of FIG. 9, the portion of the electronic layout 900 includes the example via 902, the example first metal wire 904 below the via 902, an example second metal wire 906 above the via 902, and example wing extensions 908. In the example of FIG. 9, an example first representation 910 of the first metal wire 904 and an example second representation 912 of the second metal wire 906 are superimposed on the portion of the electronic layout 900.

In the illustrated example of FIG. 9, the first representation 910 of the first metal wire 904 is indicative of a predicted position and width of the first metal wire 904 after application of OPC techniques and any subsequent process window optimization techniques. Additionally, the second representation 912 of the second metal wire 906 is indicative of a predicted position and width of the second metal wire 906 after application of OPC techniques and any subsequent process window optimization techniques. As illustrated in FIG. 9, due to the tendency of OPC techniques to result in tapered ends of metal wires, vias positioned near (e.g., within a threshold distance of) an end of a metal wire present a risk of being disconnected (e.g., open). In the example of FIG. 9, after application of OPC techniques to the first metal wire 904 (e.g., as illustrated by the first representation 910), the via 902 is at risk of being disconnected from (e.g., open with respect to) the first metal wire 904. For example, the via 902 will be shifted to compensate for OPC techniques shifting the first metal wire 904 and the second metal wire 906.

Returning to FIG. 5, as described above, the configuration file preprocessing circuitry 504 determines whether vias of a via layer are within a threshold distance of an end of a metal wire in a layer above and/or a layer below the via layer. In the example of FIG. 5, based on the configuration file preprocessing circuitry 504 determining that a via of a via layer is within a threshold distance of an end of a metal wire in a metal layer above and/or below the via layer, the metal wire extension circuitry 516 determines whether metal wire would violate a metal-to-metal shorting constraint if extended by a predetermined amount. For example, for metal wires above and/or below vias that are within a threshold distance of ends of the metal wires, the metal wire extension circuitry 516 determines whether metal wires would violate a metal-to-metal shorting constraint if extended by a predetermined amount.

In examples disclosed herein, a metal-to-metal shorting constraint refers to a threshold distance between a first metal wire and a second metal wire in the same metal layer as the first metal wire. For example, a first metal wire in a metal layer may violate the metal-to-metal shorting constraint if the first metal wire is within a threshold distance of a second metal wire in the metal layer. In examples disclosed herein, the metal-to-metal shorting constraint is based on the fabrication equipment and is determined based on electrical testing of metal layers. In the example of FIG. 5, if the metal wire extension circuitry 516 determines that a metal wire would not violate a metal-to-metal shorting constraint if extended by a predetermined amount, then the metal wire extension circuitry 516 extends the end of the metal wire by the predetermined amount.

Figure 10A:
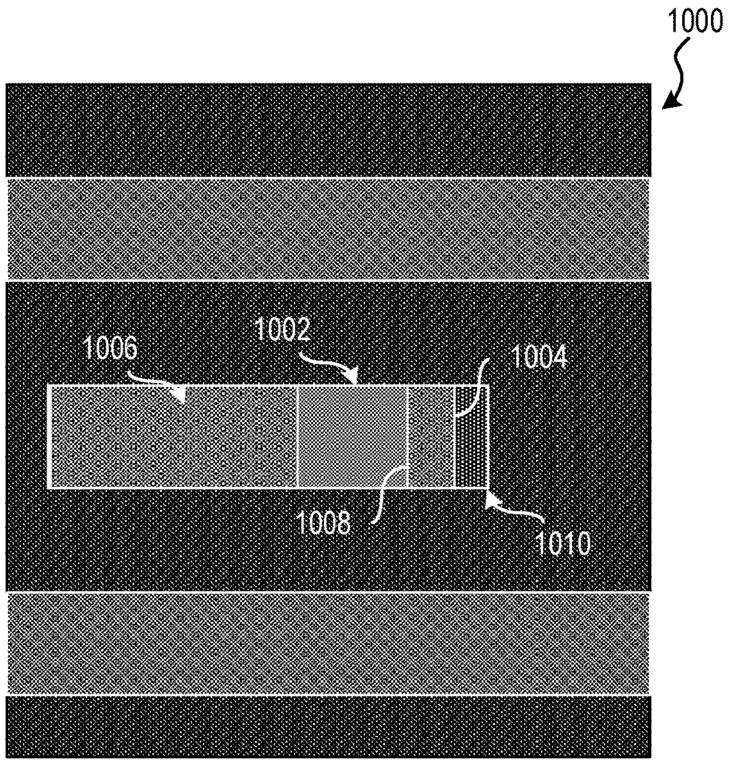
FIG. 10A illustrates a top view of a portion of an example electronic layout of an IC including adjustments for an example via near an end of an example metal wire above or below the via.

For example, FIG. 10A illustrates a top view of a portion of an example electronic layout 1000 of an IC including adjustments for an example via 1002 near an end 1004 of an example metal wire 1006 above or below the via 1002. In the example of FIG. 10A, the portion of the electronic layout 1000 includes the example via 1002 and the example metal wire 1006. The example configuration file preprocessing circuitry 504 determines whether the via 1002 is within a threshold distance of the end 1004 of the metal wire 1006. For example, the configuration file preprocessing circuitry 504 determines whether an example edge 1008 of the via 1002 is within the threshold distance of the end 1004 of the metal wire 1006.

Based on the example configuration file preprocessing circuitry 504 determining that the via 1002 is within the threshold distance of the end 1004 of the metal wire 1006, the metal wire extension circuitry 516 determines whether the metal wire 1006 would violate the metal-to-metal shorting constraint if extended by a predetermined amount. In response to the metal wire extension circuitry 516 determining that the metal wire 1006 would not violate the metal-to-metal shorting constraint if extended by the predetermined amount (e.g., there is enough distance between the metal wire 1006 and other metal wires in the metal layer), the metal wire extension circuitry 516 extends the end 1004 of the metal wire 1006 by the predetermined amount. For example, in the example of FIG. 10A, an example representation 1010 of the metal wire 1006 is superimposed on the portion of the electronic layout 1000. The representation 1010 of the metal wire 1006 is indicative of the extended end 1004 of the metal wire 1006 as determined by the metal wire extension circuitry 516. As illustrated in FIG. 10A, the extended end 1004 of the metal wire 1006 improves via coverage of the via 1002.

Returning to FIG. 5, if the metal wire extension circuitry 516 determines that the metal wire would violate the metal-to-metal shorting constraint if extended by the predetermined amount, then the configuration file preprocessing circuitry 504 determines whether the metal wire is above or below the via that is within the threshold distance of the end of the metal wire. For metal wires above the via, the via extension circuitry 506 computes dimensions by which to extend the via based on at least one of metal wires adjacent to the metal wire, the via-to-via patterning constraint, or a via-to-metal shorting constraint for a metal layer below the via. For metal wires below the via shifting circuitry 508 computes a shifted position of the via based on a predicted width and a predicted position of the metal wire below the via. In this manner, the metal wire extension circuitry 516 improves combined via coverage metrics for vias within a threshold distance of ends of metal wires (e.g., near the end of metal wires). In some examples, the metal wire extension circuitry 516 is instantiated by processor circuitry executing metal wire extension instructions and/or configured to perform operations such as those represented by the flowchart of FIG. 13.

In some examples, the via adjustment circuitry 402 includes means for extending metal wires. For example, the means for extending metal wires may be implemented by the metal wire extension circuitry 516. In some examples, the metal wire extension circuitry 516 may be instantiated by processor circuitry such as the example processor circuitry 1412 of FIG. 14. For instance, the metal wire extension circuitry 516 may be instantiated by the example microprocessor 1500 of FIG. 15 executing machine executable instructions such as those implemented by at least blocks 1304 and 1306 of FIG. 13. In some examples, the metal wire extension circuitry 516 may be instantiated by hardware logic circuitry, which may be implemented by an ASIC, XPU, or the FPGA circuitry 1600 of FIG. 16 structured to perform operations corresponding to the machine readable instructions. Additionally or alternatively, the metal wire extension circuitry 516 may be instantiated by any other combination of hardware, software, and/or firmware. For example, the metal wire extension circuitry 516 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

Figure 10B:
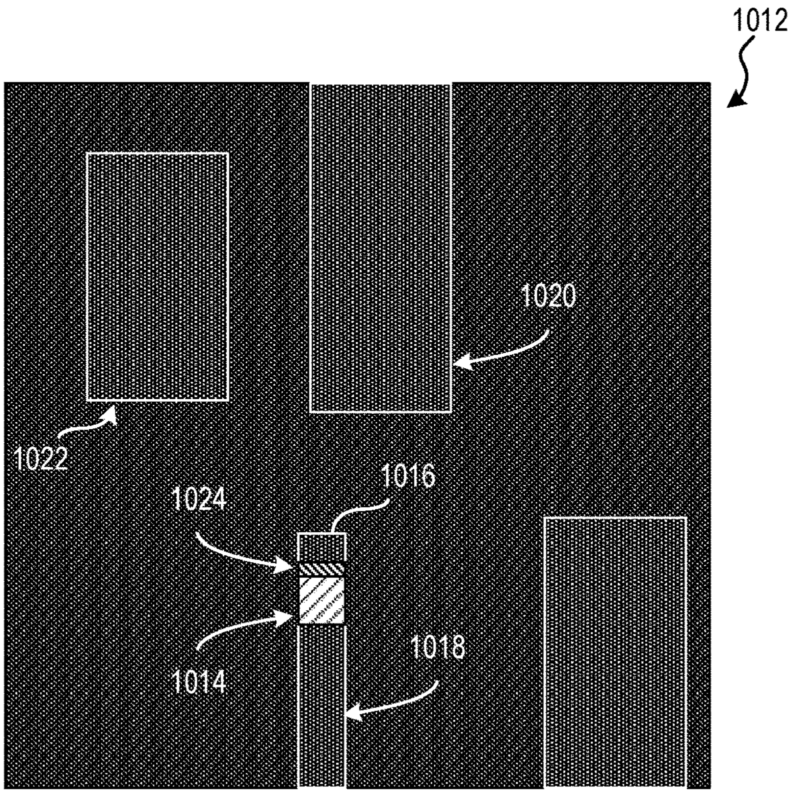
FIG. 10B illustrates a top view of a portion of an example electronic layout of an IC including adjustments for an example via near an end of an example first metal wire that is below the via.

FIG. 10B illustrates atop view of a portion of an example electronic layout 1012 of an IC including adjustments for an example via 1014 near an end 1016 of an example first metal wire 1018 that is below the via 1014. In the example of FIG. 10B, the via 1014 is within the threshold distance of the end 1016 of the first metal wire 1018. Additionally, the metal wire extension circuitry 516 determines that the first metal wire 1018 would violate the metal-to-metal shorting constraint (e.g., with respect to an example second metal wire 1020 and/or an example third metal wire 1022) if extended by the predetermined amount. As such, the configuration file preprocessing circuitry 504 determines whether the first metal wire 1018 is above or below the via 1014. Based on the configuration file preprocessing circuitry 504 determining that the first metal wire 1018 is below the via 1014, the via shifting circuitry 508 predicts, with an ML model, a width and a position of the first metal wire 1018 after application of process window optimization techniques.

Additionally, the via shifting circuitry 508 computes a shifted position of the via 1014 based on the width and the position of the first metal wire 1018. For example, based on the shifted position of the via 1014, the configuration file adjustment circuitry 510 adjusts the via 1014 in a configuration file corresponding to the IC represented by the portion of the electronic layout 1012. In the example of FIG. 10B, the configuration file adjustment circuitry 510 increases the size of the via 1014 in the direction that the via 1014 is to be shifted. For example, an example resized via 1024 represents the size of the via 1014 after the configuration file adjustment circuitry 510 increases the size of the via 1014 in the configuration file.

Table 1 illustrates example improvements achieved by examples disclosed herein as compared to traditional techniques. For example, table 1 illustrates results of a via coverage CBC and a via shorting CBC. In table 1, results of CBCs are illustrated as cumulative area of an IC that satisfies the CBC.

TABLE 1

| Contour-based Check | Traditional Techniques | Examples Disclosed Herein |
|---|---|---|
| Via Coverage Check | 731 $nm^2$ (violation count 329,000) | 1202 $nm^2$ (violation count 720) |
| Via Shorting Check | 25.5 nm (violation count 378,000) | 32.487 nm (violation count 201) |

As demonstrated by the example of table 1, examples disclosed herein significantly reduce the risk of via opens (e.g., reduce the count of vias violating the via coverage check CBC from 329,000 to 720). Additionally, as demonstrated by the example of table 1, examples disclosed herein significantly reduce the risk of via-to-metal shorting for metal layers below vias (e.g., reduce the count of vias violating the via shorting CBC from 378,000 to 201). As such, examples disclosed herein significantly improve the magnitude of via-to-metal overlap and significantly reduce the quantity of sites not meeting overlap requirements.

While an example manner of implementing the via adjustment circuitry 402 of FIG. 4 is illustrated in FIG. 5, one or more of the elements, processes, and/or devices illustrated in FIG. 4 may be combined, divided, re-arranged, omitted, eliminated, and/or implemented in any other way. Further, the example communication circuitry 502, the example configuration file preprocessing circuitry 504, the example via extension circuitry 506, the example via shifting circuitry 508, the example configuration file adjustment circuitry 510, the example photomask generation circuitry 512, the example adjustment validation circuitry 514, the example metal wire extension circuitry 516, the example via edge identification circuitry 518, the example via dimension adjustment circuitry 520, the example constraint management circuitry 522, and/or, more generally, the example via adjustment circuitry 402 of FIG. 4, may be implemented by hardware alone or by hardware in combination with software and/or firmware. Thus, for example, any of the example communication circuitry 502, the example configuration file preprocessing circuitry 504, the example via extension circuitry 506, the example via shifting circuitry 508, the example configuration file adjustment circuitry 510, the example photomask generation circuitry 512, the example adjustment validation circuitry 514, the example metal wire extension circuitry 516, the example via edge identification circuitry 518, the example via dimension adjustment circuitry 520, the example constraint management circuitry 522, and/or, more generally, the example via adjustment circuitry 402 of FIG. 4, could be implemented by processor circuitry, analog circuit(s), digital circuit(s), logic circuit(s), programmable processor(s), programmable microcontroller(s), GPU(s), DSP(s), ASIC(s), PLD(s), and/or FPLD(s) such as FPGAs. Further still, the example via adjustment circuitry 402 of FIG. 4 may include one or more elements, processes, and/or devices in addition to, or instead of, those illustrated in FIG. 5, and/or may include more than one of any or all of the illustrated elements, processes, and devices.

Figure 11:
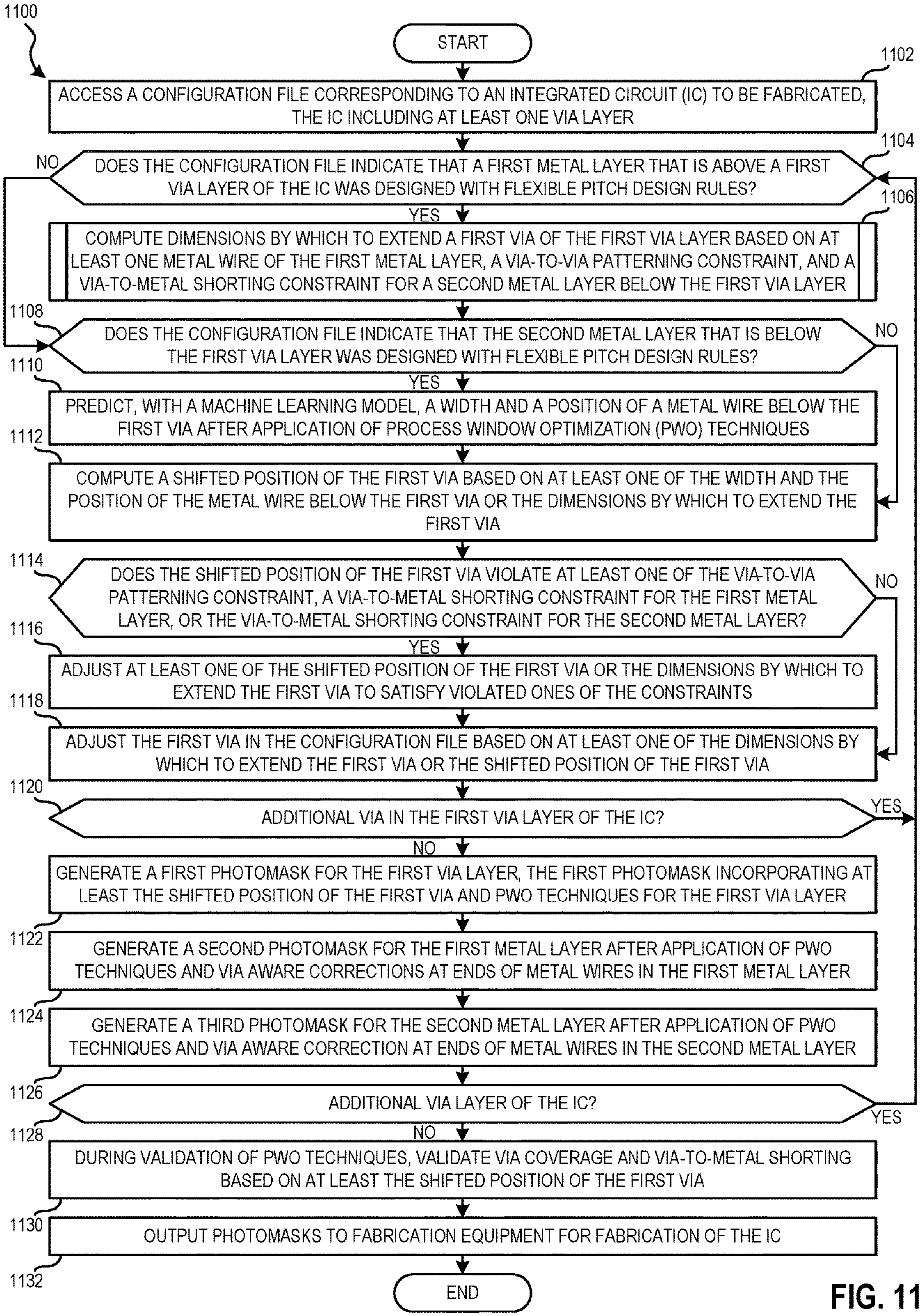
FIG. 11 is a flowchart representative of example machine readable instructions and/or example operations that may be executed by example processor circuitry to implement the via adjustment circuitry of FIGS. 4 and/or 5 to adjusts vias to improve combined via metrics and/or via-to-metal shorting metrics.
Figure 12:
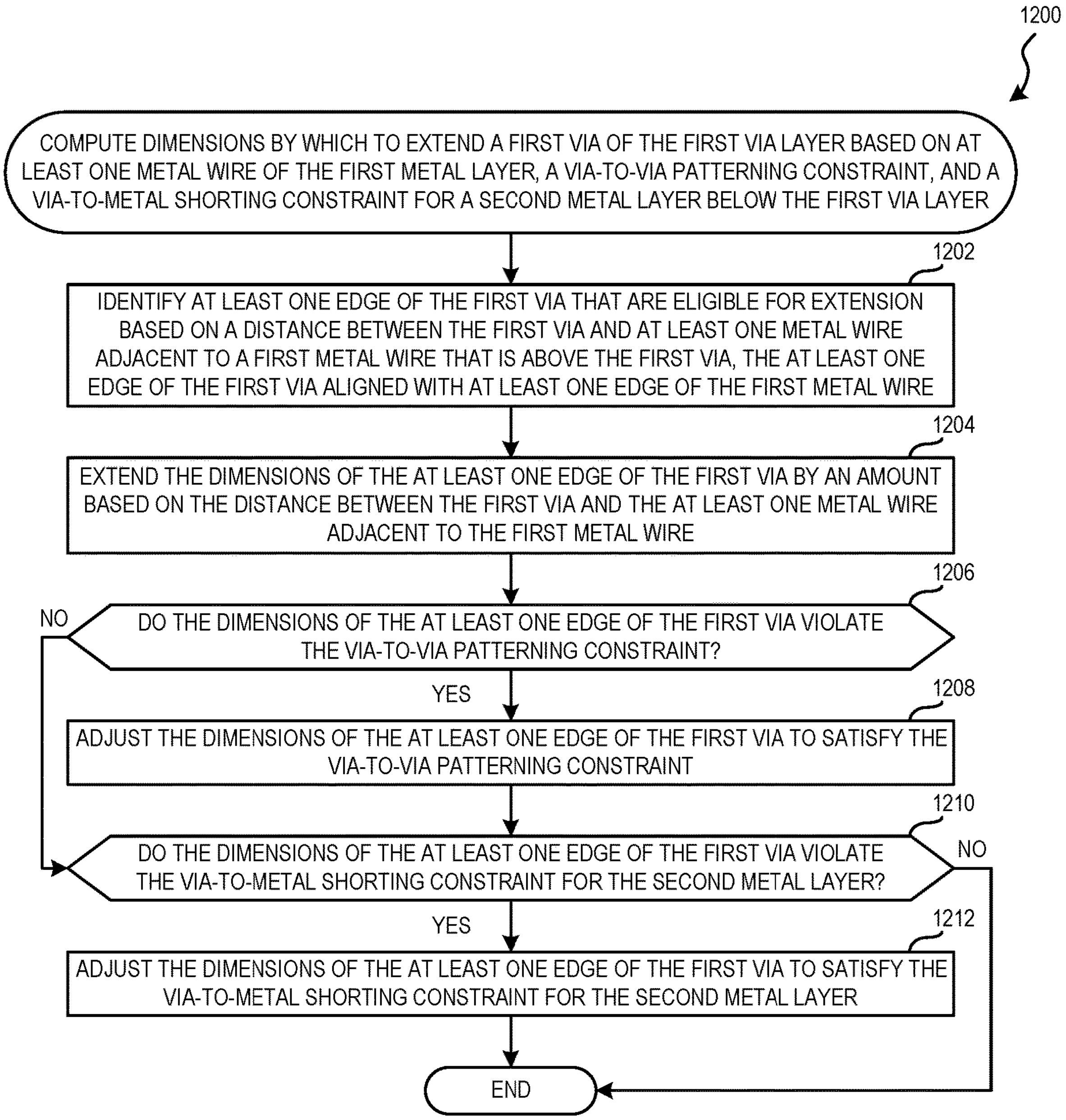
FIG. 12 is a flowchart representative of example machine readable instructions and/or example operations that may be executed by example processor circuitry to implement the via adjustment circuitry of FIGS. 4 and/or 5 to compute dimensions by which to extend vias of a via layer to improve via coverage between vias and metal wires in metal layers above the via layer.

Flowcharts representative of example machine readable instructions, which may be executed to configure processor circuitry to implement the via adjustment circuitry 402 of FIGS. 4 and/or 5, are shown in FIGS. 11, 12, and/or 13. The machine readable instructions may be one or more executable programs or portion(s) of an executable program for execution by processor circuitry, such as the processor circuitry 1412 shown in the example processor platform 1400 discussed below in connection with FIG. 14 and/or the example processor circuitry discussed below in connection with FIGS. 15 and/or 16. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 11, 12, and/or 13, many other methods of implementing the example via adjustment circuitry 402 of FIGS. 4 and/or 5 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 11, 12, and/or 13 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 11 is a flowchart representative of example machine readable instructions and/or example operations 1100 that may be executed by example processor circuitry to implement the via adjustment circuitry 402 of FIGS. 4 and/or 5 to adjusts vias to improve combined via metrics and/or via-to-metal shorting metrics. The machine readable instructions and/or the operations 1100 of FIG. 11 begin at block 1102, at which the communication circuitry 502 accesses a configuration file corresponding to an IC to be fabricated, the IC including at least one via layer. For example, at block 1102, the communication circuitry 502 accesses the configuration file 410.

In the illustrated example of FIG. 11, at block 1104, the configuration file preprocessing circuitry 504 determines whether the configuration file indicates that a first metal layer that is above a first via layer of the IC was designed with flexible pitch design rules. In response to the configuration file preprocessing circuitry 504 determining that the configuration file indicates that the first metal layer that is above the first via layer was not designed with flexible pitch design rules (block 1104: NO), the machine readable instructions and/or the operations 1100 proceed to block 1108. In response to the configuration file preprocessing circuitry 504 determining that the configuration file indicates that the first metal layer that is above the first via layer was designed with flexible pitch design rules (block 1104: YES), the machine readable instructions and/or the operations 1100 proceed to block 1106.

In the illustrated example of FIG. 11, at block 1106, the via extension circuitry 506 computes dimensions by which to extend a first via of the first via layer based on at least one metal wire of the first metal layer, a via-to-via patterning constraint, and a via-to-metal shorting constraint for a second metal layer below the first via layer. Example machine readable instructions and/or operations to implement block 1106 are illustrated and described with respect to FIG. 12. At block 1108, the configuration file preprocessing circuitry 504 determines whether the configuration file indicates that the second metal layer that is below the first via layer was designed with flexible pitch design rules.

In the illustrated example of FIG. 11, in response to the configuration file preprocessing circuitry 504 determining that the configuration file indicates that the second metal layer that is below the first via layer was not designed with flexible pitch design rules (block 1108: NO), the machine readable instructions and/or the operations 1100 proceed to block 1112. In response to the configuration file preprocessing circuitry 504 determining that the configuration file indicates that the second metal layer that is below the first via layer was designed with flexible pitch design rules (block 1108: YES), the machine readable instructions and/or the operations 1100 proceed to block 1110. At block 1110, the via shifting circuitry 508 predicts, with an ML model (e.g., an XGBoost model), a width and a position of a metal wire below the first via after application of process window optimization (PWO) techniques (e.g., OPC techniques and any subsequent PWO techniques).

For example, the ML model utilized by the via shifting circuitry 508 models shifting and size changes to the metal wire below the first via after application of OPC techniques and/or any subsequent PWO techniques. In this manner, the via shifting circuitry 508 predicts the final location of the metal wire below the first via. In the example of FIG. 11, at block 1112, the via shifting circuitry 508 computes a shifted position of the first via based on at least one of the width and the position of the metal wire below the first via or the dimensions by which to extend the first via. For example, the ML model outputs the predicted width and the predicted position of the metal wire below the first via and the via shifting circuitry 508 determines an optimal position of the first via based on at least one of the predicted width and the prediction position of the metal wire or the dimensions by which to extend the first via.

In this manner, the via adjustment circuitry 402 adjusts vias to compensate for metal wires above the vias and/or metal wires below the vias being designed with flexible pitch design rules. As such, the optimal positions at which to place vias, as determined by the via shifting circuitry 508, compensates for metal wires above the vias and/or metal wires below the vias shifting due to application of OPC techniques and any subsequent PWO techniques. In the example of FIG. 11, at block 1114, the via shifting circuitry 508 determines whether the shifted position of the first via violates at least one of the via-to-via patterning constraint, a via-to-metal shorting constraint for the first metal layer (that is above the first via), or the via-to-metal shorting constraint for the second metal layer (that is below the first via).

In the illustrated example of FIG. 11, in response to the via shifting circuitry 508 determining that the shifted position of the first via does not violate at least one of the via-to-via patterning constraint, the via-to-metal shorting constraint for the first metal layer, or the via-to-metal shorting constraint for the second metal layer (block 1114: NO), the machine readable instructions and/or the operations 1100 proceed to block 1118. In response to the via shifting circuitry 508 determining that the shifted position of the first via violates at least one of the via-to-via patterning constraint, the via-to-metal shorting constraint for the first metal layer, or the via-to-metal shorting constraint for the second metal layer (block 1114: YES), the machine readable instructions and/or the operations 1100 proceed to block 1116. At block 1116, at least one of the via shifting circuitry 508 or the via extension circuitry 506 adjusts at least one of the shifted position of the first via or the dimensions by which to extend the first via, respectively, to satisfy violated ones of the via-to-via patterning constraint, the via-to-metal shorting constraint for the first metal layer, or the via-to-metal shorting constraint for the second metal layer.

For example, at block 1116, in some examples, the via shifting circuitry 508 adjusts the shifted position of the first via to satisfy violated ones of the via-to-via patterning constraint, the via-to-metal shorting constraint for the first metal layer, or the via-to-metal shorting constraint for the second metal layer. Additionally or alternatively, at block 1116, in some examples, the via extension circuitry 506 adjusts the dimensions by which to extend the first via to satisfy violated ones of the via-to-via patterning constraint, the via-to-metal shorting constraint for the first metal layer, or the via-to-metal shorting constraint for the second metal layer. In the example of FIG. 11, at block 1118, adjusts the first via in the configuration file based on at least one of the dimensions by which to extend the first via or the shifted position of the first via.

In the illustrated example of FIG. 11, at block 1120, the configuration file preprocessing circuitry 504 determines whether there is an additional via in the first via layer of the IC. For example, based on the configuration file, the configuration file preprocessing circuitry 504 determines whether there is an additional via in the first via layer of the IC. In response to the configuration file preprocessing circuitry 504 determining that there is an additional via in the first via layer of the IC (block 1120: YES), the machine readable instructions and/or the operations 1100 return to block 1104. In response to the configuration file preprocessing circuitry 504 determining that there is not an additional via in the first via layer of the IC (block 1120: NO), the machine readable instructions and/or the operations 1100 proceed to block 1122.

In the illustrated example of FIG. 11, at block 1122, the photomask generation circuitry 512 generates a first photomask for the first via layer, the first photomask incorporating at least the shifted position of the first via and PWO techniques for the first via layer. At block 1124, the photomask generation circuitry 512 generates a second photomask for the first metal layer after application of PWO techniques and via aware corrections at ends of metal wires in the first metal layer. At block 1126, the photomask generation circuitry 512 generates a third photomask for the second metal layer after application of PWO techniques and via aware corrections at ends of metal wires in the second metal layer.

In the illustrated example of FIG. 11, at block 1128, the configuration file preprocessing circuitry 504 determines whether there is an additional via layer of the IC. For example, based on the configuration file, the configuration file preprocessing circuitry 504 determines whether there is an additional via layer of the IC. In response to the configuration file preprocessing circuitry 504 determining that there is an additional via layer of the IC (block 1128: YES), the machine readable instructions and/or the operations 1100 return to block 1104. In response to the configuration file preprocessing circuitry 504 determining that there is not an additional via layer of the IC (block 1128: NO), the machine readable instructions and/or the operations 1100 proceed to block 1130.

In the illustrated example of FIG. 11, at block 1130, during validation of PWO techniques, the adjustment validation circuitry 514 validates via coverage and via-to-metal shorting based on at least the shifted position of the first via. For example, the adjustment validation circuitry 514 performs a CBC between positions of vias as computed by the via shifting circuitry 508 and positions of metal wires as determined by PWO techniques. At block 1132, the communication circuitry 502 outputs photomasks to fabrication equipment for fabrication of the IC. For example, the communication circuitry 502 outputs the one or more photomasks 412 to the fabrication equipment 408.

FIG. 12 is a flowchart representative of example machine readable instructions and/or example operations 1200 that may be executed by example processor circuitry to implement the via adjustment circuitry 402 of FIGS. 4 and/or 5 to compute dimensions by which to extend vias of a via layer to improve via coverage between vias and metal wires in metal layers above the via layer. For example, the machine readable instructions and/or the operations 1200 of FIG. 12 may be at least one of executed and/or instantiated to implement block 1106 of FIG. 11 as described above. Additionally, for example, the machine readable instructions and/or the operations 1200 of FIG. 12 may be at least one of executed and/or instantiated to implement block 1310 of FIG. 13 as described below.

In the illustrated example of FIG. 12, the machine readable instructions and/or the operations 1200 of FIG. 12 begin at block 1202, at which the via edge identification circuitry 518 identifies at least one edge of a first via of a via layer that is eligible for extension based on a distance between the first via and at least one metal wire adjacent to a first metal wire that is above the first via, the at least one edge of the first via aligned with at least one edge of the first metal wire. At block 1204, the via dimension adjustment circuitry 520 extends the dimension of the at least one edge of the first via by an amount based on the distance between the first via and the at least one metal wire adjacent to the first metal wire. At block 1206, the constraint management circuitry 522 determines whether the dimensions of the at least one edge of the first via violate the via-to-via patterning constraint.

In the illustrated example of FIG. 12, in response to the constraint management circuitry 522 determining that the dimensions of the at least one edge of the first via do not violate the via-to-via patterning constraint (block 1206: NO), the machine readable instructions and/or the operations 1200 proceed to block 1210. In response to the constraint management circuitry 522 determining that the dimensions of the at least one edge of the first via violate the via-to-via patterning constraint (block 1206: YES), the machine readable instructions and/or the operations 1200 proceed to block 1208. At block 1208, the via dimension adjustment circuitry 520 adjusts the dimensions of the at least one edge of the first via to satisfy the via-to-via patterning constraint.

In the illustrated example of FIG. 12, at block 1210 the constraint management circuitry 522 determines whether the dimensions of the at least one edge of the first via violate the via-to-metal shorting constraint for a second metal wire below the first via. In response to the constraint management circuitry 522 determining that the dimensions of the at least one edge of the first via do not violate the via-to-metal shorting constraint for a second metal wire below the first via (block 1210: NO), the machine readable instructions and/or the operations 1200 terminate. In response to the constraint management circuitry 522 determining that the dimensions of the at least one edge of the first via violate the via-to-metal shorting constraint for a second metal wire below the first via (block 1210: YES), the machine readable instructions and/or the operations 1200 proceed to block 1212. At block 1212, the via dimension adjustment circuitry 520 adjusts the dimensions of the at least one edge of the first via to satisfy the via-to-metal shorting constraint for the second metal wire.

Figure 13:
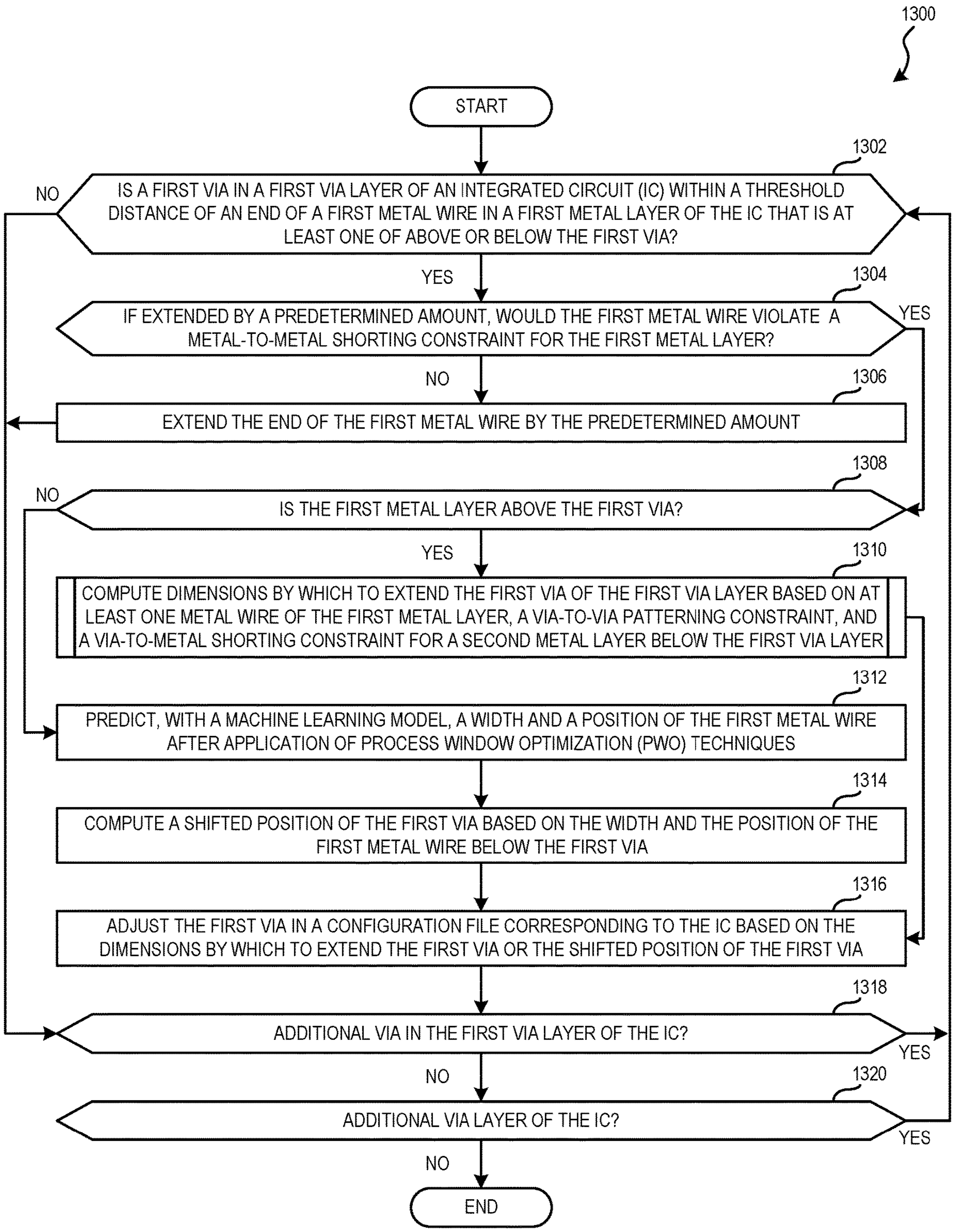
FIG. 13 is a flowchart representative of example machine readable instructions and/or example operations that may be executed by example processor circuitry to implement the via adjustment circuitry of FIGS. 4 and/or 5 to make via aware corrections near ends of metal wires.

FIG. 13 is a flowchart representative of example machine readable instructions and/or example operations 1300 that may be executed by example processor circuitry to implement the via adjustment circuitry 402 of FIGS. 4 and/or 5 to make via aware corrections near ends of metal wires. The machine readable instructions and/or the operations 1300 of FIG. 13 begin at block 1302, at which the configuration file preprocessing circuitry 504 determines whether a first via in a first via layer of an IC is within a threshold distance of an end of a first metal wire in a first metal layer of the IC that is at least one of above or below the first via. For example, the configuration file preprocessing circuitry 504 determines whether the first via is within the threshold distance of the end of the first metal wire based on a configuration file corresponding to the IC.

In the illustrated example of FIG. 13, in response to the configuration file preprocessing circuitry 504 determining that the first via is not within the threshold distance of the end of the first metal wire (block 1302: NO), the machine readable instructions and/or the operations 1300 proceed to block 1318. In response to the configuration file preprocessing circuitry 504 determining that the first via is within the threshold distance of the end of the first metal wire (block 1302: YES), the machine readable instructions and/or the operations 1300 proceed to block 1304. At block 1304, the metal wire extension circuitry 516 determines whether the first metal wire would violate a metal-to-metal shorting constraint for the first metal layer if the first metal wire were extended by a predetermined amount.

In the illustrated example of FIG. 13, in response to the metal wire extension circuitry 516 determining that the first metal wire would violate the metal-to-metal shorting constraint for the first metal layer if the first metal wire were extended by a predetermined amount (block 1304: YES), the machine readable instructions and/or the operations 1300 proceed to block 1308. In response to the metal wire extension circuitry 516 determining that the first metal wire would not violate the metal-to-metal shorting constraint for the first metal layer if the first metal wire were extended by a predetermined amount (block 1304: NO), the machine readable instructions and/or the operations 1300 proceed to block 1306. At block 1306, the metal wire extension circuitry 516 extends the end of the first metal wire by the predetermined amount.

In the illustrated example of FIG. 13, at block 1308, the configuration file preprocessing circuitry 504 determines whether the first metal layer is above the first via. In response to the configuration file preprocessing circuitry 504 determining that the first metal layer is not above the first via (block 1308: NO), the machine readable instructions and/or the operations 1300 proceed to block 1312. In response to the configuration file preprocessing circuitry 504 determining that the first metal layer is above the first via (block 1308: YES), the machine readable instructions and/or the operations 1300 proceed to block 1310. At block 1310, the via extension circuitry 506 computes dimensions by which to extend the first via of the first via layer based on at least one metal wire of the first metal layer, a via-to-via patterning constraint, and a via-to-metal shorting constraint for a second metal layer below the first via layer. Example machine readable instructions and/or operations to implement block 1310 are illustrated and described with respect to FIG. 12.

In the illustrated example of FIG. 13, at block 1312, the via shifting circuitry 508 predicts, with an ML model (e.g., an XGBoost model), a width and a position of the first metal wire below the first via after application of process window optimization (PWO) techniques (e.g., OPC techniques and any subsequent PWO techniques). At block 1314, the via shifting circuitry 508 computes a shifted position of the first via based on the width and the position of the first metal wire that is below the first via. In the example of FIG. 13, at block 1316, the configuration file adjustment circuitry 510 adjusts the first via in a configuration file corresponding to the IC based on the dimensions by which to extend the first via or the shifted position of the first via.

For example, if the first metal wire is above the first via, at block 1316, the configuration file adjustment circuitry 510 adjusts the first via in the configuration file based on the dimensions by which to extend the first via. Additionally or alternatively, at block 1316, if the first metal wire is below the first via, the configuration file adjustment circuitry 510 adjusts the first via in the configuration file to increase the size of the first via in the direction that the first via is to be shifted (e.g., the shifted position of the first via). In the example of FIG. 13, at block 1318, the configuration file preprocessing circuitry 504 determines whether there is an additional via in the first via layer of the IC.

In the illustrated example of FIG. 13, in response to the configuration file preprocessing circuitry 504 determining that there is an additional via in the first via layer of the IC (block 1318: YES), the machine readable instructions and/or the operations 1300 return to block 1302. In response to the configuration file preprocessing circuitry 504 determining that there is not an additional via in the first via layer of the IC (block 1318: NO), the machine readable instructions and/or the operations 1300 proceed to block 1320. At block 1320, the configuration file preprocessing circuitry 504 determines whether there is an additional via layer of the IC. In response to the configuration file preprocessing circuitry 504 determining that there is an additional via layer of the IC (block 1320: YES), the machine readable instructions and/or the operations 1300 return to block 1302. In response to the configuration file preprocessing circuitry 504 determining that there is not an additional via layer of the IC (block 1320: NO), the machine readable instructions and/or the operations 1300 terminate.

Figure 14:
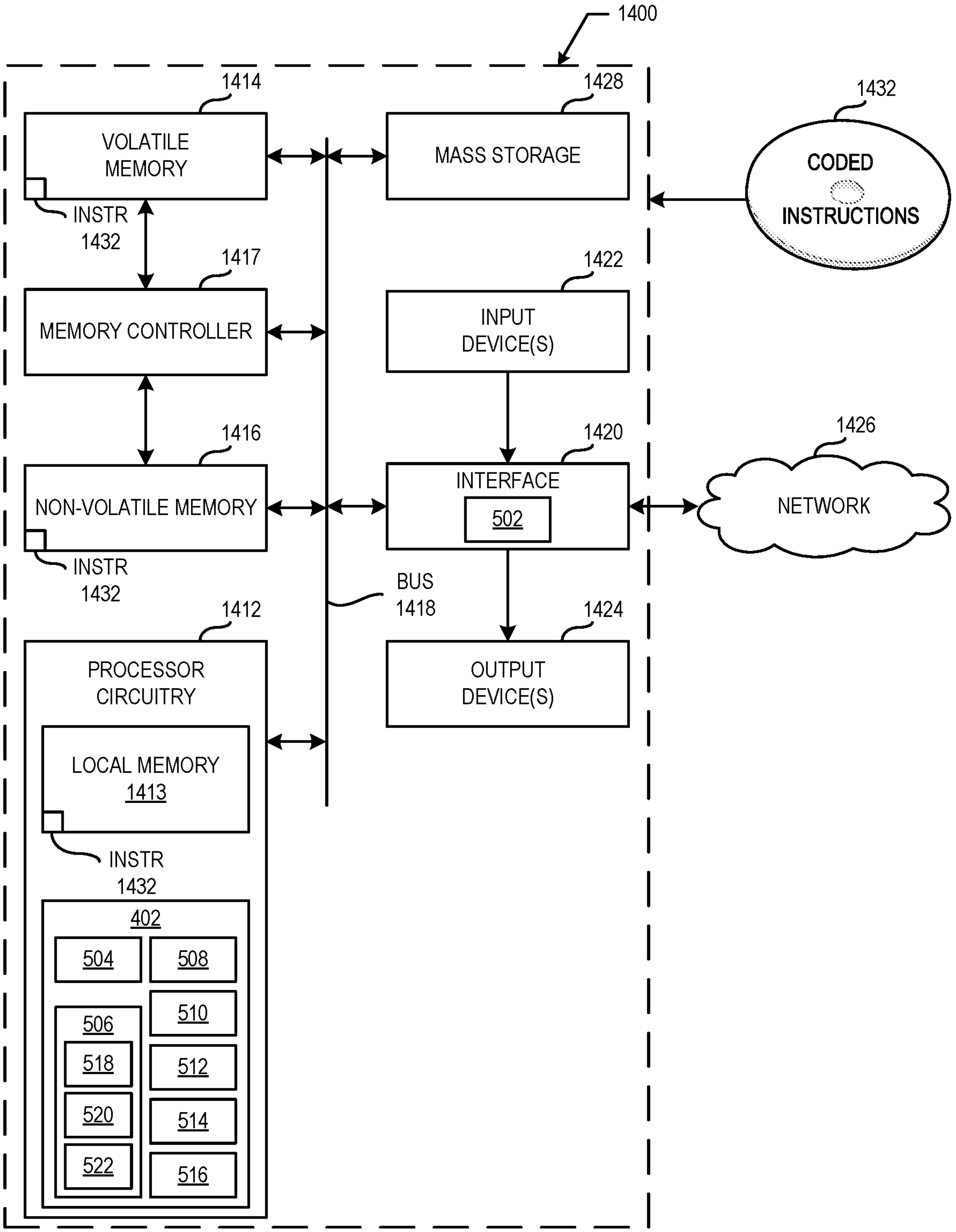
FIG. 14 is a block diagram of an example processing platform including processor circuitry structured to execute the example machine readable instructions and/or the example operations of FIGS. 11, 12, and/or 13 to implement the via adjustment circuitry of FIGS. 4 and/or 5.

FIG. 14 is a block diagram of an example processor platform 1400 structured to execute and/or instantiate the machine readable instructions and/or the operations of FIGS. 11, 12, and/or 13 to implement the via adjustment circuitry 402 of FIGS. 4 and/or 5. The processor platform

1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs, microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the example configuration file preprocessing circuitry 504, the example via extension circuitry 506, the example via shifting circuitry 508, the example configuration file adjustment circuitry 510, the example photomask generation circuitry 512, the example adjustment validation circuitry 514, the example metal wire extension circuitry 516, the example via edge identification circuitry 518, the example via dimension adjustment circuitry 520, and/or the example constraint management circuitry 522.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc. In this examples, the interface circuitry 1420 implements the example communication circuitry 502.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1432, which may be implemented by the machine readable instructions and/or operations of FIGS. 11, 12, and/or 13, may be stored in the mass storage device 1428, in the volatile memory 1414, in the non-volatile memory 1416, and/or on a removable non-transitory computer readable storage medium such as a CD or DVD.

Figure 15:
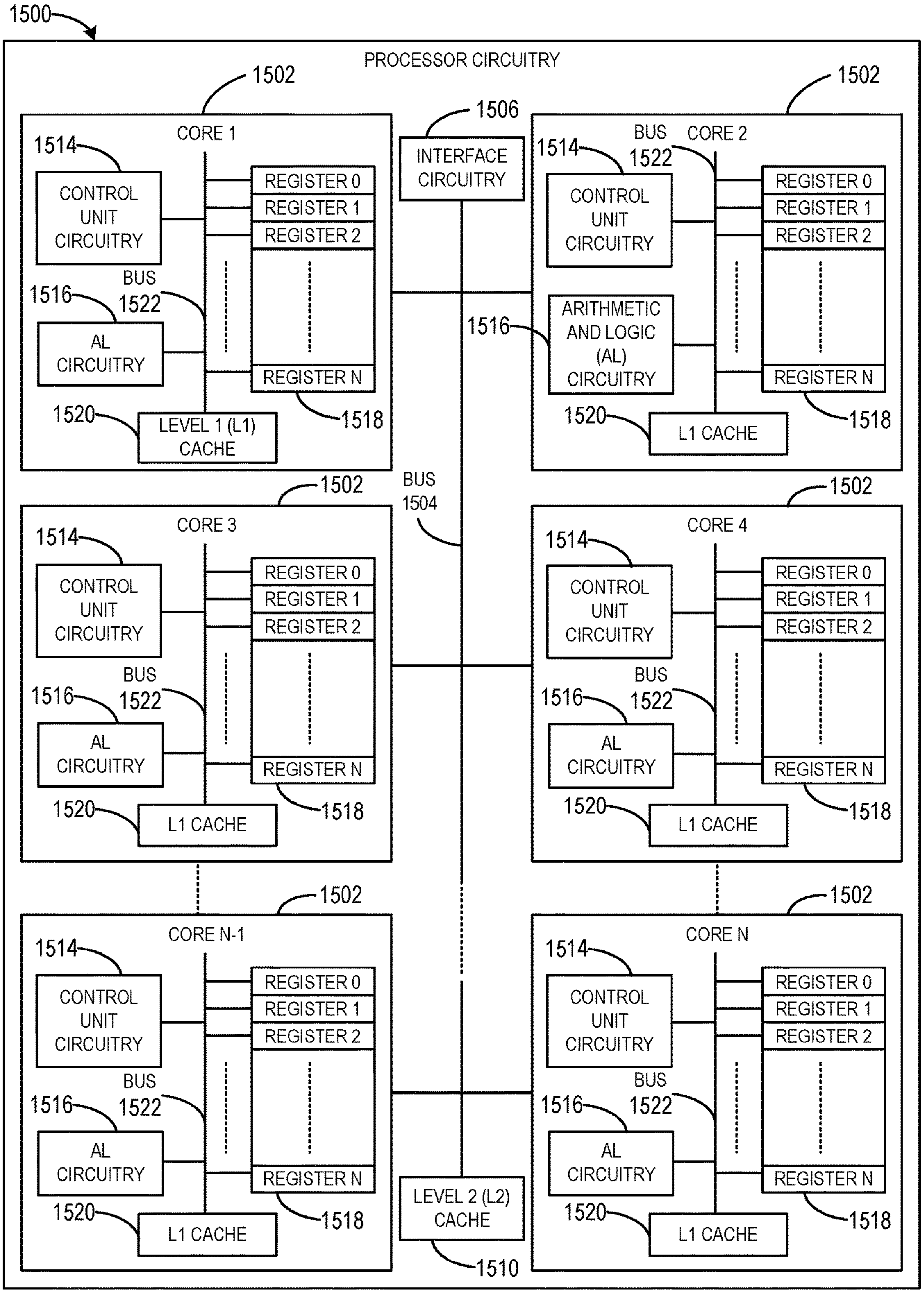
FIG. 15 is a block diagram of an example implementation of the processor circuitry of FIG. 14.

FIG. 15 is a block diagram of an example implementation of the processor circuitry 1412 of FIG. 14. In this example, the processor circuitry 1412 of FIG. 14 is implemented by a microprocessor 1500. For example, the microprocessor 1500 may be a general purpose microprocessor (e.g., general purpose microprocessor circuitry). The microprocessor 1500 executes some or all of the machine readable instructions of the flowcharts of FIGS. 11, 12, and/or 13 to effectively instantiate the circuitry of FIG. 5 as logic circuits to perform the operations corresponding to those machine readable instructions. In some such examples, the circuitry of FIG. 5 is instantiated by the hardware circuits of the microprocessor 1500 in combination with the instructions. For example, the microprocessor 1500 may be implemented by multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowcharts of FIGS. 11, 12, and/or 13.

The cores 1502 may communicate by a first example bus 1504. In some examples, the first bus 1504 may be implemented by a communication bus to effectuate communication associated with one(s) of the cores 1502. For example, the first bus 1504 may be implemented by at least one of an Inter-Integrated Circuit (I2C) bus, a Serial Peripheral Interface (SPI) bus, a PCI bus, or a PCIe bus. Additionally or alternatively, the first bus 1504 may be implemented by any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2 cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry 1516 (sometimes referred to as an ALU or arithmetic and logic circuitry), a plurality of registers 1518, the local memory 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 (e.g., control circuitry) includes semiconductor-based circuits structured to control data movement (e.g., coordinate data movement) within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The second bus 1522 may be implemented by at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
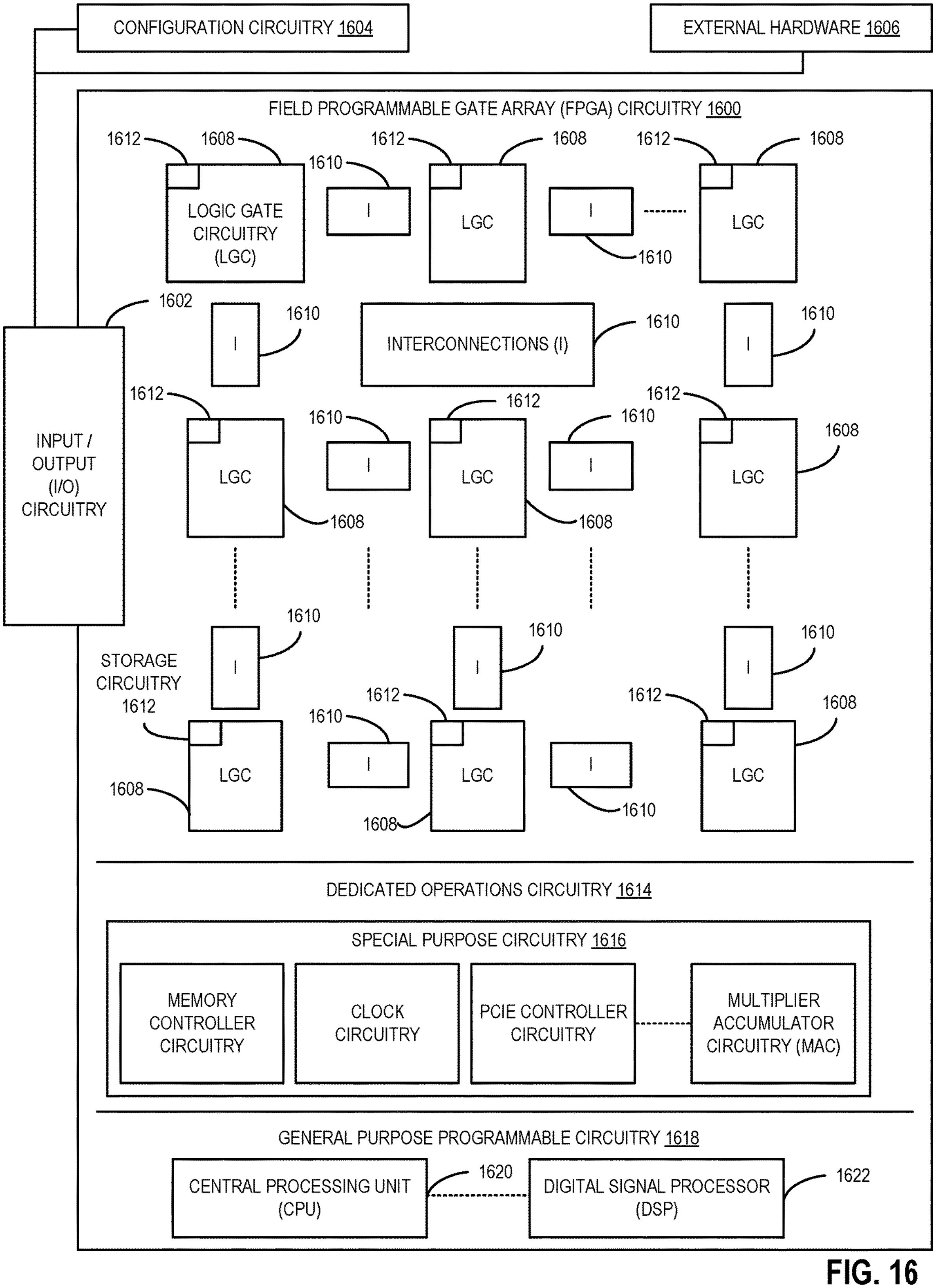
FIG. 16 is a block diagram of another example implementation of the processor circuitry of FIG. 14.

FIG. 16 is a block diagram of another example implementation of the processor circuitry 1412 of FIG. 14. In this example, the processor circuitry 1412 is implemented by FPGA circuitry 1600. For example, the FPGA circuitry 1600 may be implemented by an FPGA. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine readable instructions represented by the flowcharts of FIGS. 11, 12, and/or 13 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions represented by the flowcharts of FIGS. 11, 12, and/or 13. In particular, the FPGA circuitry 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowcharts of FIGS. 11, 12, and/or 13. As such, the FPGA circuitry 1600 may be structured to effectively instantiate some or all of the machine readable instructions of the flowcharts of FIGS. 11, 12, and/or 13 as dedicated logic circuits to perform the operations corresponding to those software instructions in a dedicated manner analogous to an ASIC. Therefore, the FPGA circuitry 1600 may perform the operations corresponding to the some or all of the machine readable instructions and/or operations of FIGS. 11, 12, and/or 13 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware 1606. For example, the configuration circuitry 1604 may be implemented by interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may be implemented by external hardware circuitry. For example, the external hardware 1606 may be implemented by the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and the configurable interconnections 1610 are configurable to instantiate one or more operations that may correspond to at least some of the machine readable instructions and/or operations of FIGS. 11, 12, and/or 13 and/or other desired operations. The logic gate circuitry 1608 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The configurable interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitry 1412 of FIG. 14, many other approaches are contemplated. For example, as mentioned above, modern FPGA circuitry may include an on-board CPU, such as one or more of the example CPU 1620 of FIG. 16. Therefore, the processor circuitry 1412 of FIG. 14 may additionally be implemented by combining the example microprocessor 1500 of FIG. 15 and the example FPGA circuitry 1600 of FIG. 16. In some such hybrid examples, a first portion of the machine readable instructions represented by the flowcharts of FIGS. 11, 12, and/or 13 may be executed by one or more of the cores 1502 of FIG. 15, a second portion of the machine readable instructions represented by the flowcharts of FIGS. 11, 12, and/or 13 may be executed by the FPGA circuitry 1600 of FIG. 16, and/or a third portion of the machine readable instructions represented by the flowcharts of FIGS. 11, 12, and/or 13 may be executed by an ASIC. It should be understood that some or all of the circuitry of FIG. 5 may, thus, be instantiated at the same or different times. Some or all of the circuitry may be instantiated, for example, in one or more threads executing concurrently and/or in series. Moreover, in some examples, some or all of the circuitry of FIG. 5 may be implemented within one or more virtual machines and/or containers executing on the microprocessor.

In some examples, the processor circuitry 1412 of FIG. 14 may be in one or more packages. For example, the microprocessor 1500 of FIG. 15 and/or the FPGA circuitry 1600 of FIG. 16 may be in one or more packages. In some examples, an XPU may be implemented by the processor circuitry 1412 of FIG. 14, which may be in one or more packages. For example, the XPU may include a CPU in one package, a DSP in another package, a GPU in yet another package, and an FPGA in still yet another package.

Figure 17:
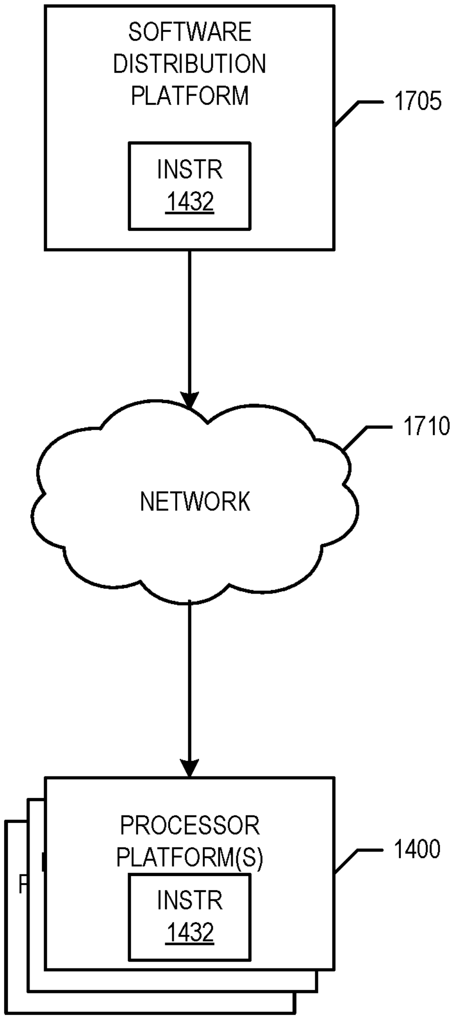
FIG. 17 is a block diagram of an example software distribution platform (e.g., one or more servers) to distribute software (e.g., software corresponding to the example machine readable instructions of FIGS. 11, 12, and/or 13) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1705 to distribute software such as the example machine readable instructions 1432 of FIG. 14 to hardware devices owned and/or operated by third parties is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine readable instructions 1432 of FIG. 14.

In the illustrated example of FIG. 17, the third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine readable instructions 1432, which may correspond to the example machine readable instructions and/or the example operations 1100 of FIG. 11, the example machine readable instructions and/or the example operations 1200, and/or the example machine readable instructions and/or the example operations 1300, as described above. The one or more servers of the example software distribution platform 1705 are in communication with an example network 1710, which may correspond to any one or more of the Internet and/or any of the example network 406 and/or the example network 1426 described above.

In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1432 from the software distribution platform 1705. For example, the software, which may correspond to the example machine readable instructions and/or the example operations 1100 of FIG. 11, the example machine readable instructions and/or the example operations 1200, and/or the example machine readable instructions and/or the example operations 1300, may be downloaded to the example processor platform 1400, which is to execute the machine readable instructions 1432 to implement the via adjustment circuitry 402. In some examples, one or more servers of the software distribution platform 1705 periodically offer, transmit, and/or force updates to the software (e.g., the example machine readable instructions 1432 of FIG. 14) to ensure improvements, patches, updates, etc., are distributed and applied to the software at the end user devices.

From the foregoing, it will be appreciated that example systems, methods, apparatus, and articles of manufacture have been disclosed that adjust vias in integrated circuits based on machine learning. For example, disclosed systems, methods, apparatus, and articles of manufacture mitigate risks of insufficient via coverage and reduce via-to-metal shorting risks in ICs. Disclosed systems, methods, apparatus, and articles of manufacture improve the efficiency of using a computing device by providing a larger process window during fabrication of ICs which allows fabrication equipment to operate with lower tolerances. By operating with lower tolerances, fabrication equipment can fabricate ICs more quickly than before. Additionally, disclosed systems, methods, apparatus, and articles of manufacture improve overlap between vias and metal wires which provides higher yield of ICs, even in cases where the fabrication equipment tolerances are very high (e.g., such as for fabrication equipment that achieves high isolation resistance values). Moreover, overlap between vias and metal wires can be adjusted as needed based on additional data derived from fabrication processes. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to adjust vias in integrated circuits based on machine learning are disclosed herein. Further examples and combinations thereof include the following:

Example 1 includes an apparatus to adjust at least one via in an integrated circuit (IC) based on machine learning (ML), the apparatus comprising at least one memory, machine readable instructions, and processor circuitry to at least one of instantiate or execute the machine readable instructions to compute a dimension by which to extend a first via based on at least one of a first metal wire in a first layer of the IC above the first via, a via-to-via patterning constraint, or a via-to-metal shorting constraint for a second layer of the IC below the first via, compute a shifted position of the first via based on at least one of (a) the dimension or (b) a width and a position of a second metal wire below the first via, the width and the position predicted by an ML model, and adjust a configuration file corresponding to the IC based on at least one of the dimension or the shifted position of the first via.

Example 2 includes the apparatus of example 1, wherein the width and the position of the second metal wire predicted by the ML model is to identify the width and the position of the second metal wire after application of a process window optimization technique.

Example 3 includes the apparatus of any of examples 1 or 2, wherein the second metal wire is in the second layer of the IC, and the processor circuitry is to compute the dimension by which to extend the first via based on the configuration file indicating that the first layer of the IC was designed with flexible pitch design rules, and predict, with the ML model, the width and the position of the second metal wire based on the configuration file indicating that the second layer of the IC was designed with flexible pitch design rules.

Example 4 includes the apparatus of any of examples 1, 2, or 3, wherein the via-to-metal shorting constraint for the second layer is a first via-to-metal shorting constraint, and the processor circuitry is to adjust the shifted position of the first via based on the shifted position violating at least one of the via-to-via patterning constraint, a second via-to-metal shorting constraint for the first layer, or the first via-to-metal shorting constraint for the second layer.

Example 5 includes the apparatus of any of examples 1, 2, 3, or 4, wherein the first metal wire is adjacent to a third metal wire that is above the first via, and to compute the dimension by which to extend the first via, the processor circuitry is to identify an edge of the first via that is eligible for extension based on a distance between the first via and the first metal wire, extend the dimension of the edge of the first via by an amount based on the distance between the first via and the first metal wire, and adjust the dimension based on the dimension violating at least one of the via-to-via patterning constraint or the via-to-metal shorting constraint for the second layer.

Example 6 includes the apparatus of any of examples 1, 2, 3, 4, or 5, wherein the processor circuitry is to, based on a second via of a third layer of the IC being within a threshold distance of an end of a third metal wire, determine whether extending the third metal wire by a predetermined amount would violate a metal-to-metal shorting constraint for a fourth layer of the IC, and based on determining that extending the third metal wire by the predetermined amount would not violate the metal-to-metal shorting constraint for the fourth layer of the IC, extend the end of the third metal wire by the predetermined amount.

Example 7 includes the apparatus of example 6, wherein the dimension is a first dimension, the width and the position are a first width and a first position, the shifted position is a first shifted position, and based on determining that extending the third metal wire by the predetermined amount would violate the metal-to-metal shorting constraint for the fourth layer of the IC, the processor circuitry is to compute a second dimension by which to extend the second via based on the third metal wire being above the second via, compute a second shifted position of the second via based on a second width and a second position of the third metal wire, the second width and the second position predicted by the ML model, and adjust the configuration file based on the second dimension or the second shifted position of the second via.

Example 8 includes a non-transitory machine readable storage medium comprising instructions that, when executed, cause processor circuitry to at least compute dimensions by which to extend a via based on at least one of a first metal wire in a first layer of an integrated circuit (IC) above the via, a via-to-via patterning constraint, or a via-to-metal shorting constraint for a second layer of the IC below the via, compute a shifted position of the via based on at least one of (a) the dimensions or (b) a width and a position of a second metal wire below the via, the width and the position predicted by a machine learning model, and adjust a configuration file corresponding to the IC based on at least one of the dimensions or the shifted position of the via.

Example 9 includes the non-transitory machine readable storage medium of example 8, wherein the via-to-metal shorting constraint for the second layer is a first via-to-metal shorting constraint, and the instructions cause the processor circuitry to adjust the shifted position of the via based on the shifted position violating at least one of the via-to-via patterning constraint, a second via-to-metal shorting constraint for the first layer, or the first via-to-metal shorting constraint for the second layer.

Example 10 includes the non-transitory machine readable storage medium of any of examples 8 or 9, wherein the via is in a third layer of the IC, the third layer is disposed between the first layer and the second layer, the via is a first via, and the via-to-via patterning constraint corresponds to a threshold amount of resistance between the first via and a second via adjacent to the first via, the first via and the second via in the third layer.

Example 11 includes the non-transitory machine readable storage medium of any examples 8, 9, or 10, wherein the via-to-metal shorting constraint corresponds to a threshold distance between the via and a third metal wire adjacent to the second metal wire, the second metal wire and the third metal wire in the second layer of the IC.

Example 12 includes the non-transitory machine readable storage medium of any of examples 8, 9, 10, or 11, wherein the first metal wire is adjacent to a third metal wire that is above the via, and to compute the dimensions by which to extend the via, the instructions cause the processor circuitry to identify an edge of the via that is eligible for extension based on a distance between the via and at least the first metal wire, extend the dimensions of the edge of the via by an amount based on the distance between the via and at least the first metal wire, and adjust the dimensions based on the dimensions violating at least one of the via-to-via patterning constraint or the via-to-metal shorting constraint for the second layer.

Example 13 includes the non-transitory machine readable storage medium of any of examples 8, 9, 10, 11, or 12, wherein the via is a first via, and the instructions cause the processor circuitry to, based on a second via of a third layer of the IC being within a threshold distance of an end of a third metal wire, determine whether extending the third metal wire by a predetermined amount would violate a metal-to-metal shorting constraint for a fourth layer of the IC, and based on determining that extending the third metal wire by the predetermined amount would not violate the metal-to-metal shorting constraint for the fourth layer of the IC, extend the end of the third metal wire by the predetermined amount.

Example 14 includes the non-transitory machine readable storage medium of example 13, wherein the dimensions are first dimensions, the width and the position are a first width and a first position, the shifted position is a first shifted position, and based on determining that extending the third metal wire by the predetermined amount would violate the metal-to-metal shorting constraint for the fourth layer of the IC, the instructions cause the processor circuitry to compute second dimensions by which to extend the second via based on the third metal wire being above the second via, compute a second shifted position of the second via based on a second width and a second position of the third metal wire, the second width and the second position predicted by the machine learning model, and adjust the configuration file based on the second dimensions or the second shifted position of the second via.

Example 15 includes a method to adjust a via in an integrated circuit (IC) based on machine learning (ML), the method comprising computing, by executing an instruction with processor circuitry, at least one dimension by which to extend the via based on at least one of a first metal wire above the via, a via-to-via patterning constraint, or a via-to-metal shorting constraint for a layer of the IC below the via, predicting, by executing an ML model with the processor circuitry, a width and a first position of a second metal wire below the via, and computing, by executing an instruction with the processor circuitry, a second position to which the via is to be shifted based on at least one of (a) the dimension or (b) the width and the first position of the second metal wire below the via.

Example 16 includes the method of example 15, further including adjusting the second position to which the via is to be shifted based on the second position violating the via-to-via patterning constraint.

Example 17 includes the method of any of examples 15 or 16, wherein the layer is a first layer, the via-to-metal shorting constraint for the first layer is a first via-to-metal shorting constraint, and the method further includes adjusting the second position to which the via is to be shifted based on the second position violating at least one of a second via-to-metal shorting constraint for a second layer of the IC, or the first via-to-metal shorting constraint for the first layer of the IC.

Example 18 includes the method of any of examples 15, 16, or 17, wherein the first metal wire is adjacent to a third metal wire that is above the via, and computing the at least one dimension by which to extend the via includes identifying an edge of the via that is eligible for extension based on a distance between the via and at least the first metal wire, extending the at least one dimension of the edge of the via by an amount based on the distance between the via and at least the first metal wire, and adjusting the at least one dimension based on the at least one dimension violating at least one of the via-to-via patterning constraint or the via-to-metal shorting constraint for the layer.

Example 19 includes the method of any of examples 15, 16, 17, or 18, wherein the layer of the IC is a first layer, and the method further includes based on a second via of a second layer of the IC being within a threshold distance of an end of a third metal wire, determining whether extending the third metal wire by a predetermined amount would violate a metal-to-metal shorting constraint for a third layer of the IC, and based on determining that extending the third metal wire by the predetermined amount would not violate the metal-to-metal shorting constraint for the third layer of the IC, extending the end of the third metal wire by the predetermined amount.

Example 20 includes the method of example 19, wherein the via is a first via, the at least one dimension is a first dimension, the width is a first width, and the method further includes, based on determining that extending the third metal wire by the predetermined amount would violate the metal-to-metal shorting constraint for the third layer of the IC computing a second dimension by which to extend a second via based on the third metal wire being above the second via, predicting, using the ML model, a second width and a third position of the third metal wire, and computing a fourth position to which the second via is to be shifted based on the second width and the third position of the third metal wire.

Example 21 includes an apparatus to adjust at least one via in an integrated circuit (IC) based on machine learning (ML), the apparatus comprising interface circuitry to access a configuration file corresponding to an IC to be fabricated, and processor circuitry including one or more of at least one of a central processor unit (CPU), a graphics processor unit (GPU), or a digital signal processor (DSP), the at least one of the CPU, the GPU, or the DSP having control circuitry to control data movement within the processor circuitry, arithmetic and logic circuitry to perform one or more first operations corresponding to instructions, and one or more registers to store a first result of the one or more first operations, the instructions in the apparatus, a Field Programmable Gate Array (FPGA), the FPGA including first logic gate circuitry, a plurality of configurable interconnections, and storage circuitry, the first logic gate circuitry and the plurality of the configurable interconnections to perform one or more second operations, the storage circuitry to store a second result of the one or more second operations, or Application Specific Integrated Circuitry (ASIC) including second logic gate circuitry to perform one or more third operations, the processor circuitry to perform at least one of the first operations, the second operations, or the third operations to instantiate via extension circuitry to compute dimensions by which to extend a first via based on at least one of a first metal wire in a first layer of the IC above the first via, a via-to-via patterning constraint, or a via-to-metal shorting constraint for a second layer of the IC below the first via, and via shifting circuitry to compute a shifted position of the first via based on at least one of the dimensions or a predicted width and a predicted position of a second metal wire below the first via, the predicted width and the predicted position predicted by an ML model.

Example 22 includes the apparatus of example 21, wherein the via-to-metal shorting constraint for the second layer is a first via-to-metal shorting constraint, and the processor circuitry is to perform at least one of the first operations, the second operations, or the third operations to instantiate the via shifting circuitry to adjust the shifted position of the first via based on the shifted position violating at least one of the via-to-via patterning constraint, a second via-to-metal shorting constraint for the first layer, or the first via-to-metal shorting constraint for the second layer.

Example 23 includes the apparatus of any of examples 21 or 22, wherein the first metal wire is adjacent to a third metal wire that is above the first via, and the processor circuitry is to perform at least one of the first operations, the second operations, or the third operations to instantiate via edge identification circuitry to identify at least one edge of the first via that is eligible for extension based on a distance between the first via and at least the first metal wire, and via dimension adjustment circuitry to extend the dimensions of the at least one edge of the first via by an amount based on the distance between the first via and at least the first metal wire, and adjust the dimensions based on the dimensions violating at least one of the via-to-via patterning constraint or the via-to-metal shorting constraint for the second layer.

Example 24 includes the apparatus of any of examples 21, 22, or 23, wherein the processor circuitry is to perform at least one of the first operations, the second operations, or the third operations to instantiate metal wire extension circuitry to, based on a second via of a third layer of the IC being within a threshold distance of an end of a third metal wire, determine whether extending the third metal wire by a predetermined amount would violate a metal-to-metal shorting constraint for a fourth layer of the IC, and based on determining that extending the third metal wire by the predetermined amount would not violate the metal-to-metal shorting constraint for the fourth layer of the IC, extend the end of the third metal wire by the predetermined amount.

Example 25 includes the apparatus of example 24, wherein the dimensions are first dimensions, the predicted width and the predicted position are a first predicted width and a first predicted position, the shifted position is a first shifted position, and based on determining that extending the third metal wire by the predetermined amount would violate the metal-to-metal shorting constraint for the fourth layer of the IC, the processor circuitry is to perform at least one of the first operations, the second operations, or the third operations to instantiate the via extension circuitry to compute second dimensions by which to extend the second via based on the third metal wire being above the second via, and the via shifting circuitry to compute a second shifted position of the second via based on a second predicted width and a second predicted position of the third metal wire, the second predicted width and the second predicted position predicted by the ML model.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to adjust at least one via in an integrated circuit (IC) based on machine learning (ML), the apparatus comprising:
- at least one memory;
- machine readable instructions; and
- processor circuitry to at least one of instantiate or execute the machine readable instructions to:
  - compute a dimension by which to extend a first via based on at least one of a first metal wire in a first layer of the IC above the first via, a via-to-via patterning constraint, or a via-to-metal shorting constraint for a second layer of the IC below the first via;
  - compute a shifted position of the first via based on at least one of (a) the dimension or (b) a width and a position of a second metal wire below the first via, the width and the position predicted by an ML model; and
  - adjust a configuration file corresponding to the IC based on at least one of the dimension or the shifted position of the first via.

2. The apparatus of claim 1, wherein the width and the position of the second metal wire predicted by the ML model is to identify the width and the position of the second metal wire after application of a process window optimization technique.

3. The apparatus of claim 1, wherein the second metal wire is in the second layer of the IC, and the processor circuitry is to:
- compute the dimension by which to extend the first via based on the configuration file indicating that the first layer of the IC was designed with flexible pitch design rules; and
- predict, with the ML model, the width and the position of the second metal wire based on the configuration file indicating that the second layer of the IC was designed with flexible pitch design rules.

4. The apparatus of claim 1, wherein the via-to-metal shorting constraint for the second layer is a first via-to-metal shorting constraint, and the processor circuitry is to adjust the shifted position of the first via based on the shifted position violating at least one of the via-to-via patterning constraint, a second via-to-metal shorting constraint for the first layer, or the first via-to-metal shorting constraint for the second layer.

5. The apparatus of claim 1, wherein the first metal wire is adjacent to a third metal wire that is above the first via, and to compute the dimension by which to extend the first via, the processor circuitry is to:

identify an edge of the first via that is eligible for extension based on a distance between the first via and the first metal wire;

extend the dimension of the edge of the first via by an amount based on the distance between the first via and the first metal wire; and adjust the dimension based on the dimension violating at least one of the via-to-via patterning constraint or the via-to-metal shorting constraint for the second layer.

6. The apparatus of claim 1, wherein the processor circuitry is to:

based on a second via of a third layer of the IC being within a threshold distance of an end of a third metal wire, determine whether extending the third metal wire by a predetermined amount would violate a metal-to-metal shorting constraint for a fourth layer of the IC; and based on determining that extending the third metal wire by the predetermined amount would not violate the metal-to-metal shorting constraint for the fourth layer of the IC, extend the end of the third metal wire by the predetermined amount.

7. The apparatus of claim 6, wherein the dimension is a first dimension, the width and the position are a first width and a first position, the shifted position is a first shifted position, and based on determining that extending the third metal wire by the predetermined amount would violate the metal-to-metal shorting constraint for the fourth layer of the IC, the processor circuitry is to:

compute a second dimension by which to extend the second via based on the third metal wire being above the second via;

compute a second shifted position of the second via based on a second width and a second position of the third metal wire, the second width and the second position predicted by the ML model; and adjust the configuration file based on the second dimension or the second shifted position of the second via.

8. A non-transitory machine readable storage medium comprising instructions that, when executed, cause processor circuitry to at least:

compute dimensions by which to extend a via based on at least one of a first metal wire in a first layer of an integrated circuit (IC) above the via, a via-to-via patterning constraint, or a via-to-metal shorting constraint for a second layer of the IC below the via;

compute a shifted position of the via based on at least one of (a) the dimensions or (b) a width and a position of a second metal wire below the via, the width and the position predicted by a machine learning model; and adjust a configuration file corresponding to the IC based on at least one of the dimensions or the shifted position of the via.

9. The non-transitory machine readable storage medium of claim 8, wherein the via-to-metal shorting constraint for the second layer is a first via-to-metal shorting constraint, and the instructions cause the processor circuitry to adjust the shifted position of the via based on the shifted position violating at least one of the via-to-via patterning constraint, a second via-to-metal shorting constraint for the first layer, or the first via-to-metal shorting constraint for the second layer.

10. The non-transitory machine readable storage medium of claim 8, wherein the via is in a third layer of the IC, the third layer is disposed between the first layer and the second layer, the via is a first via, and the via-to-via patterning constraint corresponds to a threshold amount of resistance between the first via and a second via adjacent to the first via, the first via and the second via in the third layer.

11. The non-transitory machine readable storage medium of claim 8, wherein the via-to-metal shorting constraint corresponds to a threshold distance between the via and a third metal wire adjacent to the second metal wire, the second metal wire and the third metal wire in the second layer of the IC.

12. The non-transitory machine readable storage medium of claim 8, wherein the first metal wire is adjacent to a third metal wire that is above the via, and to compute the dimensions by which to extend the via, the instructions cause the processor circuitry to:

identify an edge of the via that is eligible for extension based on a distance between the via and at least the first metal wire;

extend the dimensions of the edge of the via by an amount based on the distance between the via and at least the first metal wire; and adjust the dimensions based on the dimensions violating at least one of the via-to-via patterning constraint or the via-to-metal shorting constraint for the second layer.

13. The non-transitory machine readable storage medium of claim 8, wherein the via is a first via, and the instructions cause the processor circuitry to:

based on a second via of a third layer of the IC being within a threshold distance of an end of a third metal wire, determine whether extending the third metal wire by a predetermined amount would violate a metal-to-metal shorting constraint for a fourth layer of the IC; and based on determining that extending the third metal wire by the predetermined amount would not violate the metal-to-metal shorting constraint for the fourth layer of the IC, extend the end of the third metal wire by the predetermined amount.

14. The non-transitory machine readable storage medium of claim 13, wherein the dimensions are first dimensions, the width and the position are a first width and a first position, the shifted position is a first shifted position, and based on determining that extending the third metal wire by the predetermined amount would violate the metal-to-metal shorting constraint for the fourth layer of the IC, the instructions cause the processor circuitry to:

compute second dimensions by which to extend the second via based on the third metal wire being above the second via;

compute a second shifted position of the second via based on a second width and a second position of the third metal wire, the second width and the second position predicted by the machine learning model; and adjust the configuration file based on the second dimensions or the second shifted position of the second via.

* * * * *